United States Patent
Miwa et al.

(10) Patent No.: US 8,676,553 B2
(45) Date of Patent: Mar. 18, 2014

(54) APPARATUS ABNORMALITY DIAGNOSIS METHOD AND SYSTEM

(75) Inventors: Toshiharu Miwa, Yokohama (JP); Kenji Tamaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 13/130,059

(22) PCT Filed: Nov. 17, 2009

(86) PCT No.: PCT/JP2009/069482
§ 371 (c)(1),
(2), (4) Date: Jul. 15, 2011

(87) PCT Pub. No.: WO2010/058765
PCT Pub. Date: May 27, 2010

(65) Prior Publication Data
US 2011/0264424 A1    Oct. 27, 2011

(30) Foreign Application Priority Data
Nov. 19, 2008 (JP) .................. 2008-295111

(51) Int. Cl.
G06F 7/60 (2006.01)
G06G 7/48 (2006.01)
G06F 11/00 (2006.01)

(52) U.S. Cl.
USPC ............ 703/6; 703/2; 714/25; 714/100

(58) Field of Classification Search
None
See application file for complete search history.

(56) References Cited

U.S. PATENT DOCUMENTS

| | | | |
|---|---|---|---|
| 6,061,640 A * | 5/2000 | Tanaka et al. | 702/81 |
| 7,882,394 B2 * | 2/2011 | Hosek et al. | 714/26 |
| 7,937,164 B2 * | 5/2011 | Samardzija et al. | 700/28 |
| 8,229,584 B2 * | 7/2012 | Higashide et al. | 700/110 |
| 8,285,513 B2 * | 10/2012 | Emigholz | 702/179 |
| 2007/0067678 A1 * | 3/2007 | Hosek et al. | 714/25 |
| 2007/0078553 A1 | 4/2007 | Miwa et al. | |
| 2008/0167839 A1 * | 7/2008 | Miller | 703/2 |

FOREIGN PATENT DOCUMENTS

| | | |
|---|---|---|
| JP | 04-074224 | 3/1992 |
| JP | 04-359640 | 12/1992 |
| JP | 09-073315 | 3/1997 |
| JP | 2001-337828 | 12/2001 |
| JP | 2006-344200 | 12/2006 |

* cited by examiner

Primary Examiner — Omar Fernandez Rivas
Assistant Examiner — Nithya J Moll
(74) Attorney, Agent, or Firm — Antonell, Terry, Stout & Kraus, LLP.

(57) ABSTRACT

A technique relating to an apparatus abnormality diagnosis system, capable of easily creating and adding/updating an diagnosis model with respect to an initial and new failure case, and appropriately and efficiently achieving diagnosis of abnormality and instruction of operation using the model. In the abnormality diagnosis system, an diagnosis model creating process unit creates a structured abnormality model expressing a structured abnormality of maintenance operation type to an alarm and apparatus event relating to the maintenance operation type by a graph network structure based on acquisition of maintenance operation data. And, by synthesizing the structured abnormality model with an existing structured abnormality model, the diagnosis model is updated.

15 Claims, 19 Drawing Sheets

FIG. 2

| D1 | SENSOR DATA | | |
|---|---|---|---|
| | a | b | c |
| | #1, | 2008-08-31 09:00:00, | 0.01, 1.50, ⋯.. |
| | #1, | 2008-08-31 09:00:10, | 0.02, 2.10, ⋯.. |
| | #1, | 2008-08-31 09:00:20, | 0.03, 1.30, ⋯.. |
| | #1, | 2008-08-31 09:00:30, | 0.12, 0.50, ⋯.. |
| | #1, | 2008-08-31 09:00:40, | 0.03, -1.50, ⋯.. |
| | #1, | 2008-08-31 09:00:50, | 0.05, 1.86, ⋯.. |
| | #1, | 2008-08-31 09:01:00, | 0.09, 1.35, ⋯.. |
| | #1, | 2008-08-31 09:00:10, | 0.08, 0.01, ⋯.. |

SENSOR A B ・・・

APPARATUS DATA (HISTORY)

| a | b | c | d | e |
|---|---|---|---|---|
| #1, | 2008-08-31 09:00:00, | E, | E001, | POWER ON |
| #1, | 2008-08-31 09:00:01, | E, | E002, | START ACTIVATION |
| #1, | 2008-08-31 09:00:30, | E, | E003, | START |
| #1, | 2008-08-31 09:20:05, | A, | A001, | ALARMING ABOUT UPPER LIMIT OF SENSOR A |
| #1, | 2008-08-31 09:20:40, | A, | A002, | ALARMING ABOUT LOWER LIMIT OF SENSOR B |
| #1, | 2008-08-31 09:30:50, | W, | W001, | REMOTE CENTER: ALARMING FLUCTUATIONS OF SENSOR C |
| #1, | 2008-08-31 09:30:50, | A, | A003, | PRESSURE ABNORMALITY: STOP DEVICE |
| #1, | 2008-08-31 09:01:00, | E, | E004, | START DEACTIVATION |
| #1, | 2008-08-31 09:00:10, | E, | E005, | STOP |
| #1, | 2008-08-31 09:00:10, | E, | E006, | POWER OFF |

FIG. 4

MAINTENANCE OPERATION DATA (HISTORY) — D4

| a | b | c | d | e | f | g |
|---|---|---|---|---|---|---|
| #1, | 2008-08-31 09:00, | 001, | C, | C001, | , | START DAILY CHECK |
| #1, | 2008-08-31 09:30, | 001, | C, | C002, | , | END DAILY CHECK |
| #1, | 2008-09-01 09:00, | 001, | C, | C001, | , | START DAILY CHECK |
| #1, | 2008-09-01 09:00, | 001, | C, | C002, | , | END DAILY CHECK |
| #1, | 2008-09-01 13:05, | 003, | T, | T001, | , | START TROUBLESHOOTING |
| #1, | 2008-09-01 13:30, | 003, | T, | T002, | P001, | REPLACE COMPONENT |
| #1, | 2008-09-01 13:35, | 003, | T, | T003, | , | END TROUBLESHOOTING |

| PROBABILITY OF OCCURRENCE REGARDING A02 NODE | | OUTPUT | | |
|---|---|---|---|---|
| | | T01 | T02 | T03 |
| INPUT | A01 | 0.6 | 0.4 | 0 |
| | E01 | 0.5 | 0 | 0.5 |
| | A01→E01 | 0.3 | 0.3 | 0.4 |
| | — | 0 | 0.8 | 0.2 |

801

800

| STRUCTURED ABNORMALITY DATA | PROBABILITY OF OCCURRENCE | MAINTENANCE OPERATION CODE | OPERATION DETAILS | TARGET COMPONENT NUMBER |
|---|---|---|---|---|
| A01→A02 | 0.6 | T01 | REPLACE COMPONENT | P001 |
| | 0.4 | T02 | RESTART SYSTEM | — |

| No | ABNORMALITY MODE | ABNORMALITY CASES ||| DIAGNOSIS MODEL |
|---|---|---|---|---|
| | | PHENOMENON | CAUSE FOR ABNORMALITY | <PHENOMENON> <OPERATION> |
| 1 | ABNORMALITY OF GAS FLOW | VALVE OPEN/CLOSE DEGREE (S01) IS MAXIMUM, AND GAS FLOW (S02) IS BELOW PREDETERMINED VALUE | INSUFFICIENT SUPPLY PRESSURE OF GAS SUPPLYING UNIT (P01) | S01 → S02 → P01 |
| 2 | | VALVE OPEN/CLOSE DEGREE (S01) IS 0, AND GAS FLOW (S02) IS OVER PREDETERMINED VALUE | LEAK FROM GAS VALVE (P02) | S01 → S02 → P02 |
| 3 | | GAS FLOW (S02) IS BELOW PREDETERMINED VALUE | ABNORMALITY OF VALVE CONTROLLER (P03) | S02 → P03 |
| 4 | | FURNACE BODY PRESSURE (S03) IS OVER UPPER LIMIT | ABNORMALITY OF VALVE CONTROLLER (P03) | S03 → P03 |
| 5 | ABNORMALITY OF FURNACE BODY PRESSURE CONTROL | THE NUMBER OF PUMP REVOLUTIONS (S04) IS OVER UPPER LIMIT AND FURNACE BODY PRESSURE (S03) IS INSUFFICIENT | LEAK FROM FURNACE BODY (P04) | S04 → S03 → P04 |
| 6 | | ABNORMALITY OF FURNACE BODY PRESSURE (S03) | ABNORMALITY OF PUMP CONTROLLER (P05) | S03 → P05 |
| 7 | | THE NUMBER OF PUMP REVOLUTIONS (S04) IS OVER UPPER LIMIT AND FURNACE BODY PRESSURE (S03) IS INSUFFICIENT | DEGRADATION OF VACUUM PUMP (P06) | S04 → S03 → P06 | a    b    c    d

1201

| PROBABILITY OF OCCURRENCE REGARDING S02 | | OUTPUT | | |
|---|---|---|---|---|
| | | P01 | P02 | P03 |
| INPUT | S01 | 0.5 | 0.5 | 0 |
| | — | 0 | 0 | 1 |

1202

| PROBABILITY OF OCCURRENCE REGARDING S03 | | OUTPUT | | | |
|---|---|---|---|---|---|
| | | P03 | P04 | P05 | P06 |
| INPUT | S04 | 0 | 0.5 | 0 | 0.5 |
| | — | 0.5 | 0 | 0.5 | 0 |

| DATE AND TIME OF OCCURRENCE | ERROR CODE |
|---|---|
| 2008/9/1 10:22 | A008 |
| 2008/9/1 10:33 | A008 |
| 2008/9/1 10:41 | A009 |
| 2008/9/1 10:41 | A011 |
| 2008/9/1 10:42 | T009 |
| 2008/9/1 10:43 | A006 |
| 2008/9/1 10:44 | A010 | though, in an apparatus as being complicated and multi-
APPARATUS ABNORMALITY DIAGNOSIS METHOD AND SYSTEM

TECHNICAL FIELD

The present invention relates to technologies for analysis, detection, maintenance, and others of apparatuses (such as equipment) and, in particular, to a method and system of creating an diagnosis model for diagnosing a cause when a sign of abnormality of an apparatus is detected or an abnormality occurs and making an instruction about operation, maintenance details, or others.

BACKGROUND ART

In various apparatuses, such as cogeneration apparatuses and vacuum apparatuses, for example, a stable operation without a failure is a minimum function required. Also, even when the apparatus becomes out of order, the apparatus has to be recovered to a normal state as soon as possible. On the other hand, in an apparatus as being complicated and multi-functioned, there are many types of apparatus failures. However, methods of operation all types of failures have not yet been established in advance. Therefore, when a sign of abnormality is detected or an abnormality occurs in an apparatus, how to handle such situations often depends on previous knowledge of people (operators) who perform maintenance operations.

In such maintenance operations depending on the knowledge of the operators, as the number of apparatuses to be handled increases, the quality of maintenance operations may disadvantageously decrease.

To get around this problem, an information processing system can be used to diagnose and detect an abnormality of an apparatus and make an instruction for operation and maintenance details, etc.

Also conventionally, an abnormality diagnosis method or system has been reported in which human-dependent knowledge regarding apparatus failure operation is stored in an information processing system and, in place of previous determinations based on the expertise of operators, a phenomenon occurring in the apparatus is given to the information processing system, which then outputs a cause for and operation method of that abnormality. Examples of conventional technologies are as follows.

In a technology disclosed in Japanese Patent Application Laid-Open Publication No. 4-74224 (Patent Document 1), structure knowledge indicating a correlation among components of an apparatus to be diagnosed and failure knowledge for each component are input, and a chain of structured abnormality of failures based on a correlation among the components of the apparatus is created with a process of reasoning these pieces of knowledge.

In a technology disclosed in Japanese Patent Application Laid-Open Publication No. 4-359640 (Patent Document 2), causalities between a phenomenon occurring in an apparatus and a cause item thereof are represented by symbols, which are replaced with numerical values capable of distinguishing the strength of structured abnormality based on the type of symbols and are output as possible-cause candidates in the order in which the largest total value of additional values for each cause comes first.

In a technology disclosed in Japanese Patent Application Laid-Open Publication No. 9-73315 (Patent Document 3), cases regarding failures are classified into symptom, cause, treatment, and treatment evaluation, and information input in free syntax in natural language regarding each item is stored. Among case information, terms that characterize the symptom, cause, treatment, and treatment evaluation are extracted, and failure cases are created as being arranged by symptom, cause, treatment, and treatment evaluation. Then, by inputting a keyword regarding symptom, cause, and treatment, the previous failure cases are searched for a similar or matching failure case.

In a technology disclosed in Japanese Patent Application Laid-Open Publication No. 2001-337828 (Patent Document 4), an abnormal symptom, a symptom determination condition, a cause, and a operation are input in advance for each component of an apparatus to create an abnormality knowledge rule. When an alarm occurs from the apparatus, based on the abnormality knowledge rule, an abnormality symptom, a cause, and a operation relevant to the rule are output.

PRIOR ART DOCUMENTS

Patent Documents

Patent Document 1: Japanese Patent Application Laid-Open Publication No. 4-74224
Patent Document 2: Japanese Patent Application Laid-Open Publication No. 4-359640
Patent Document 3: Japanese Patent Application Laid-Open Publication No. 9-73315
Patent Document 4: Japanese Patent Application Laid-Open Publication No. 2001-337828

DISCLOSURE OF THE INVENTION

Problems to be Solved by the Invention

In the examples of conventional technologies described above (such as the abnormality diagnosis method), in order to achieve analyses, countermeasure or operation instructions, and others, the presence of a predetermined model (an diagnosis model) is taken as a prerequisite. Also, an input of information of the failure cases, for example, information regarding symptom, cause, operation, and others occurring for each component of the apparatus, is taken as a prerequisite.

However, to create or update a model, a human operation is required. Inputting information of failure cases itself requires many processes, thereby increasing cost. In particular, as the number of apparatuses to be diagnosed and the number of types of failures increase, the number of processes required to input information of failure cases necessary for abnormality diagnosis increases, thereby making operation of actual system difficult.

Moreover, when a new failure case is input, how to represent the failure case is different depending on the determination by an input person. Therefore, there is a possibility that failure case data cannot be correctly created.

Furthermore, with the apparatuses to be diagnosed becoming complicated (such as being provided with a plurality of sensors), it may be difficult to create an appropriate model.

Still further, in a stage of introducing a system (an abnormality diagnosis system), a method of operation all failures is not necessarily input. Therefore, a mechanism in which a model can be easily added and updated even for anew failure case is thought to be necessary.

In the technology of Patent Document 1 described above, an input of the structure knowledge and the failure knowledge for each component are required to be input. However, means for automatically inputting these pieces of information are not described.

In the technology of Patent Document 2 described above, the causalities between the phenomenon occurring in the apparatus and its cause item are taken as input information. However, means for automatically inputting these causalities are not described.

In the technology of Patent Document 4 described above, the abnormality symptom, symptom determination condition, cause, and operation are taken as input information. However, means for automatically inputting these pieces of information are not described.

In the technology of Patent Document 3 described above, cases regarding failures are classified into the symptom, cause, treatment, and treatment evaluation described above, and a free syntax in natural language regarding each item is taken as input information. Therefore, compared with Patent Documents 1, 2, and 4 described above, the number of processes required for inputting itself is small, but no input means is described.

The present invention has been devised in view of the problems as described above. A main object relates to an apparatus abnormality diagnosis system, and to provide a technology capable of easily creating, adding, and updating a model (an diagnosis model) for an initial and new (additional/updating) failure case and, by using the model, capable of appropriately and efficiently achieving an abnormality diagnosis and detection, an instruction for operation and maintenance, and others.

Means for Solving the Problems

The typical ones of the inventions disclosed in the present application will be briefly described as follows. To achieve the objects described above, a typical embodiment of the present invention relates to a method or system of performing an apparatus abnormality diagnosis process for estimating and diagnosing an abnormality cause by using information processing with a computer when a sign of abnormality of a target apparatus is detected or an abnormality occurs (these cases can be generally and collectively referred to as "at the time of an abnormality") and making an instruction for operation or maintenance operation details (information output), the method or system having the following structure.

In the embodiment, a model (an diagnosis model) for use in an apparatus abnormality diagnosis process is automatically created, added, and updated, etc., with information processing (a statistical process), and an apparatus abnormality diagnosis process is performed by using that model. One characteristic is a method of creating that model, a technology using a graph network, which is different from conventional technologies.

In the embodiment, in an apparatus diagnosis model creating process for an apparatus abnormality diagnosis process, process steps are provided as follows, for example (which are achieved by information processing of a computer).

(S1) A first process step of obtaining (collecting) maintenance operation data regarding the apparatus (including an apparatus identification number, a date and time and type of a maintenance operation, information of components to be maintained, and others), and the alarm data (including the type of an alarm, a date and time of occurrence, and others) and the apparatus event data (including a type of an apparatus event (operation state) of the apparatus, a date and time of occurrence, and others) occurring within a predetermined time based on the maintenance operation data (date and time, etc.).

(S2) A second process step of, by using the data obtained in the first process step, creating a structured abnormality between the relevant maintenance operation data (type, etc.) and at least one of an apparatus event (type, etc.) or alarm associated therewith (type, etc.) as a structured abnormality model represented by a graph network structure.

(S3) A third process step of, by synthesizing the new structured abnormality model created in the second process step with a structured abnormality model (an (old) diagnosis model) created so far and recalculating a probability of occurrence among nodes updated in the graphic network structure, updating the diagnosis model configured to include the structured abnormality model.

Furthermore, the method of the present embodiment includes a fourth process step of performing the apparatus abnormality diagnosis process by using at least one of the new apparatus event data and alarm data and the diagnosis model updated in the third process step.

Effects of the Invention

The effects obtained by typical aspects of the present invention will be briefly described below. According to a typical embodiment of the present invention, the present invention relates to an apparatus abnormality diagnosis system capable of easily creating, adding, and updating a model (an diagnosis model) for an initial and new (additional/updating) failure case and, by using this model, capable of appropriately and efficiently achieving an abnormality diagnosis and detection, an instruction for operation and maintenance, and others.

In particular, according to the present embodiment, a newly-occurring maintenance operation result can be easily reflected onto the model. Therefore, even when the number of apparatuses to be handled is large, an abnormality diagnosis can be efficiently made. Also, a statistical process can contribute to clarification of a failure mechanism that has been unnoticed so far.

BRIEF DESCRIPTIONS OF THE DRAWINGS

FIG. 2 is a drawing that depicts an example of an output result of sensor data output from a target apparatus in the present abnormality diagnosis system;

FIG. 3 is a drawing that depicts an example of an output result of apparatus data (history) including alarm data and apparatus event data from a target apparatus in the present abnormality diagnosis system;

FIG. 4 is a drawing that depicts an example of an output result of maintenance operation data (history) of a target apparatus in the present abnormality diagnosis system;

FIG. 10 is a drawing that depicts abnormality cases in the vacuum apparatus of FIG. 9;

FIG. 18 is a drawing that depicts a graph network after a structured computation is made on the graph network of FIG. 17;

FIG. 19 is a drawing that depicts information about dates and times of occurrence of maintenance operation types and alarm types belonging to a group G2 of the graph network of FIG. 18;

Figure 12:
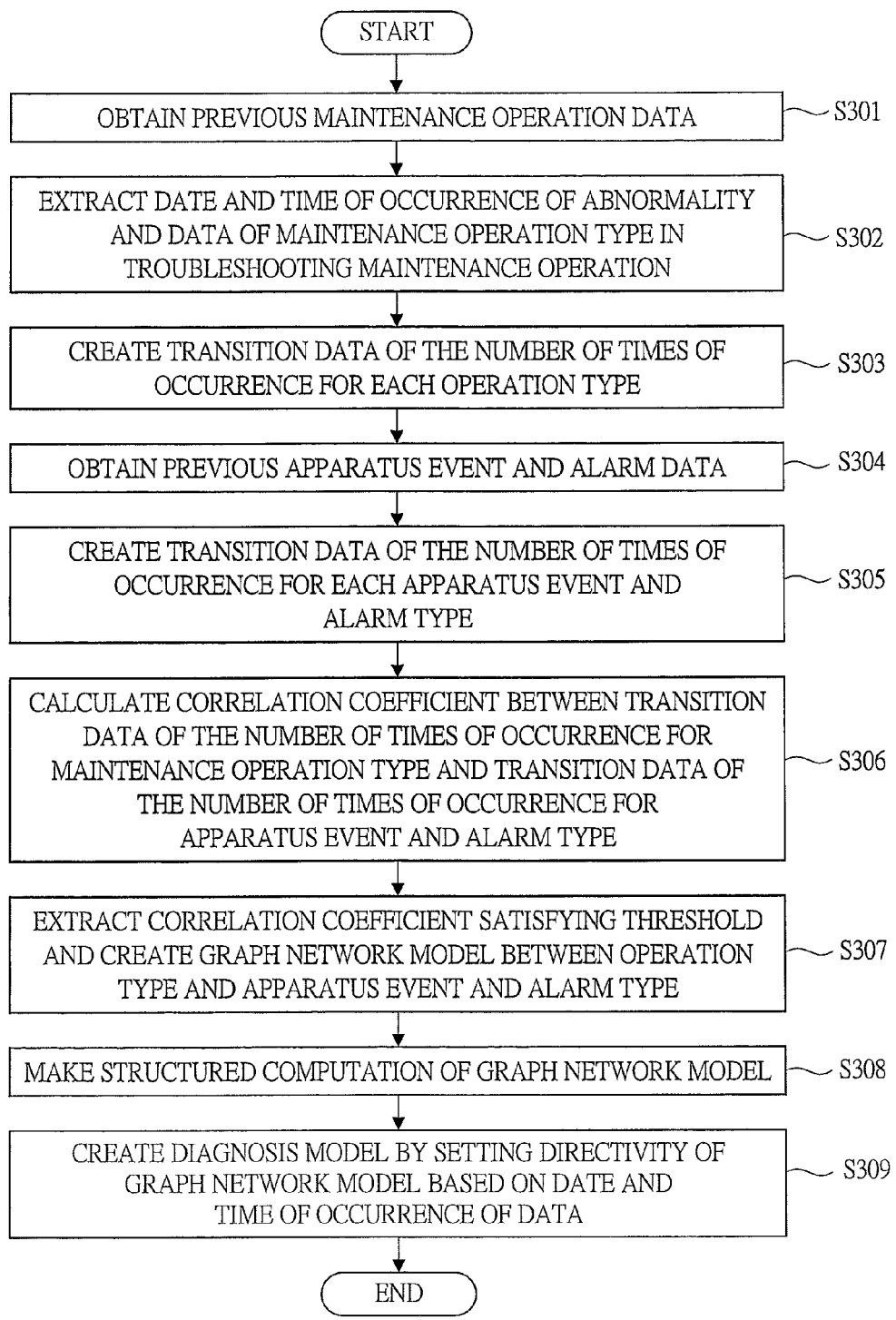
FIG. 12 is a flow diagram that depicts details of a method and process of creating a structured abnormality model between a maintenance operation and alarm and apparatus event type in the diagnosis model in the present abnormality diagnosis system.
Figure 18:
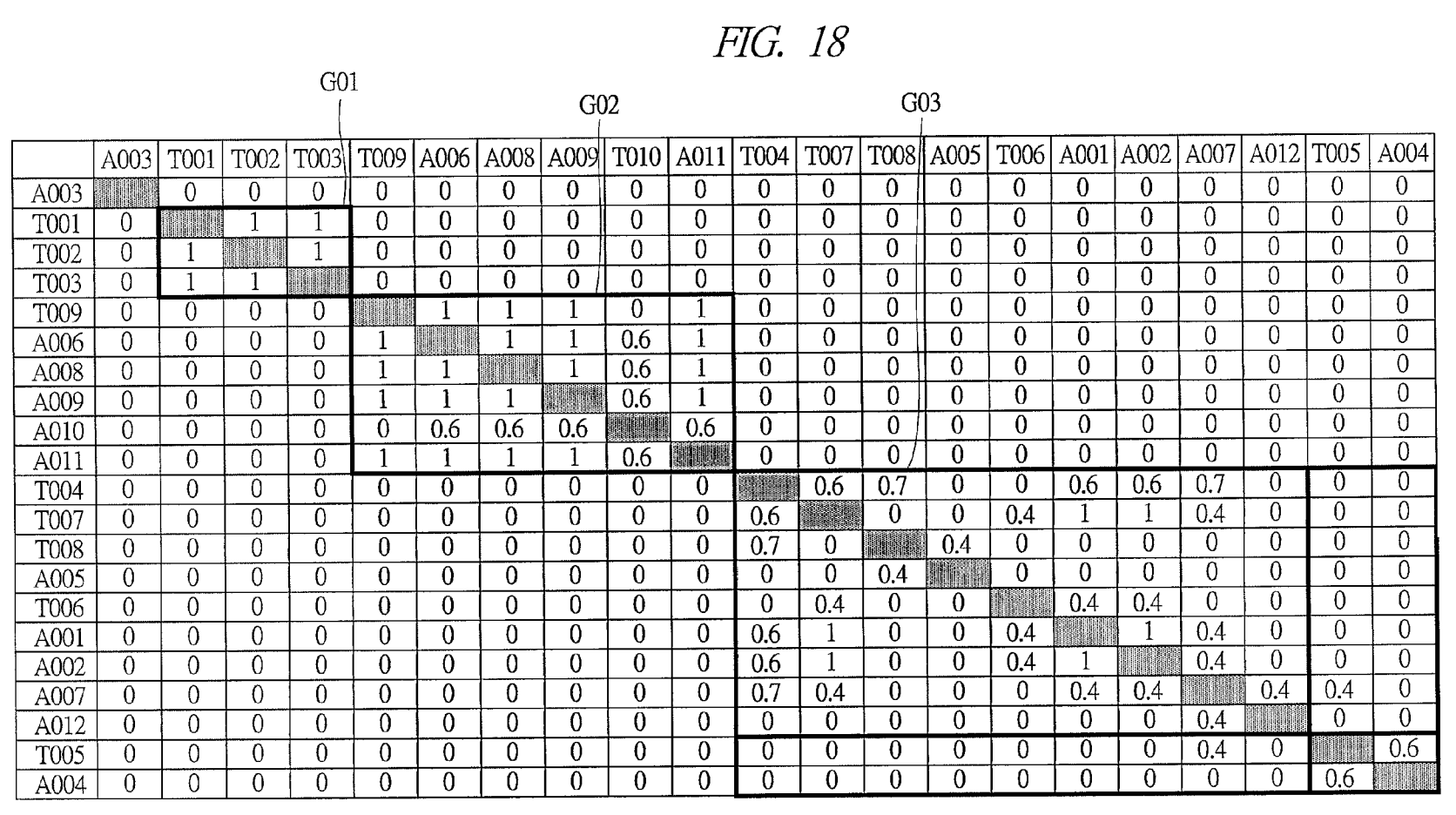
Figure 20A:
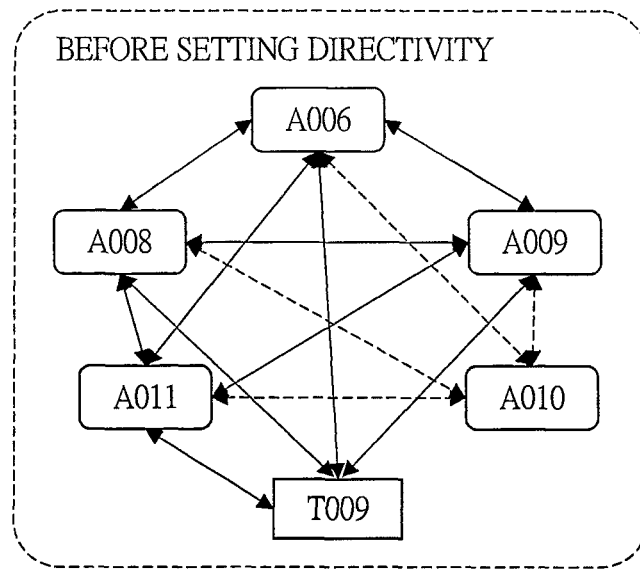
Figure 20B:
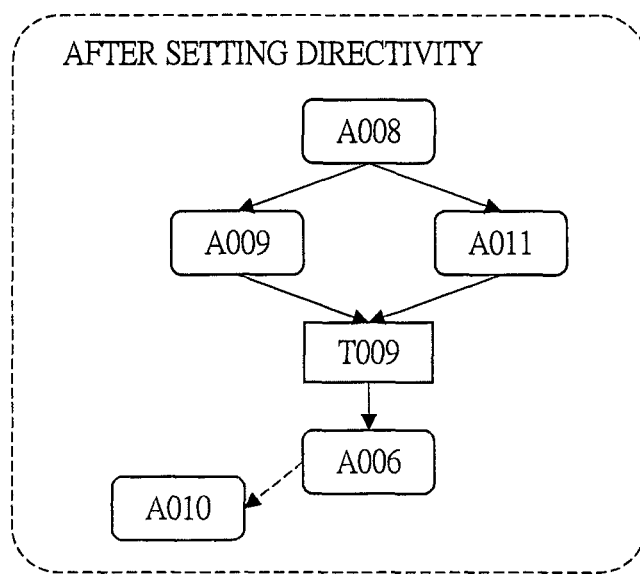
Figure 21:
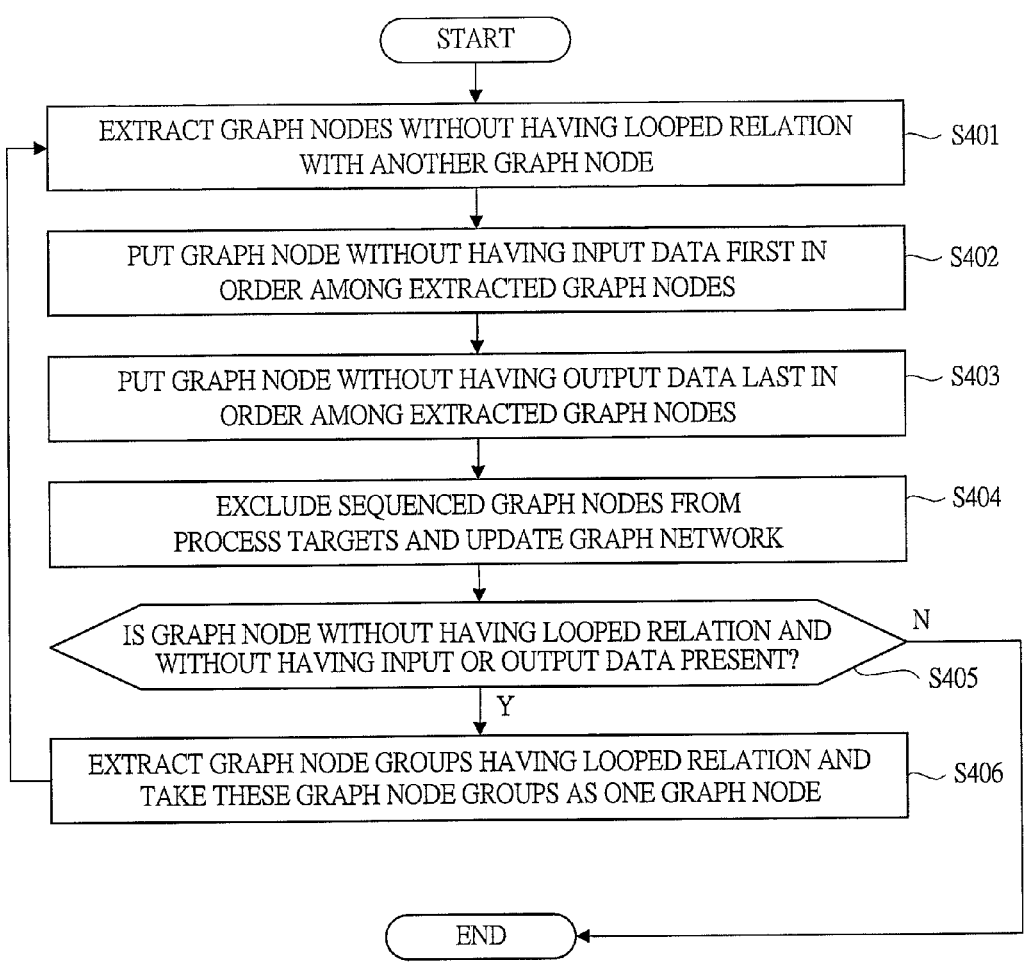

FIGS. 20A and 20B are drawings depicting structured abnormality models before and after setting directivity with respect to the maintenance operation types and the alarm types belonging to the group G2 of the graph network of FIG. 18, in which FIG. 20A depicting the case before setting and FIG. 20B depicting the case after setting; and FIG. 21 is a flow diagram depicting details of a structured computation of the graph network in the structured abnormality model creating process of FIG. 12.

BEST MODE FOR CARRYING OUT THE INVENTION

Hereinafter, embodiments of the present invention (apparatus abnormality diagnosis method including an apparatus diagnosis model creating method, and an information processing system carrying out a processing according to the method) will be described in detail with reference to the accompanying drawings (FIGS. 1 to 21). Note that components having the same function are denoted by the same reference symbols throughout the drawings for describing the embodiment, and the repetitive description thereof will be omitted. The present diagnosis method is a method of using an diagnosis model created by the present creating method and, when a sign of abnormality of a target apparatus is detected or an abnormality occurs, diagnosing its cause.

Figure 1:
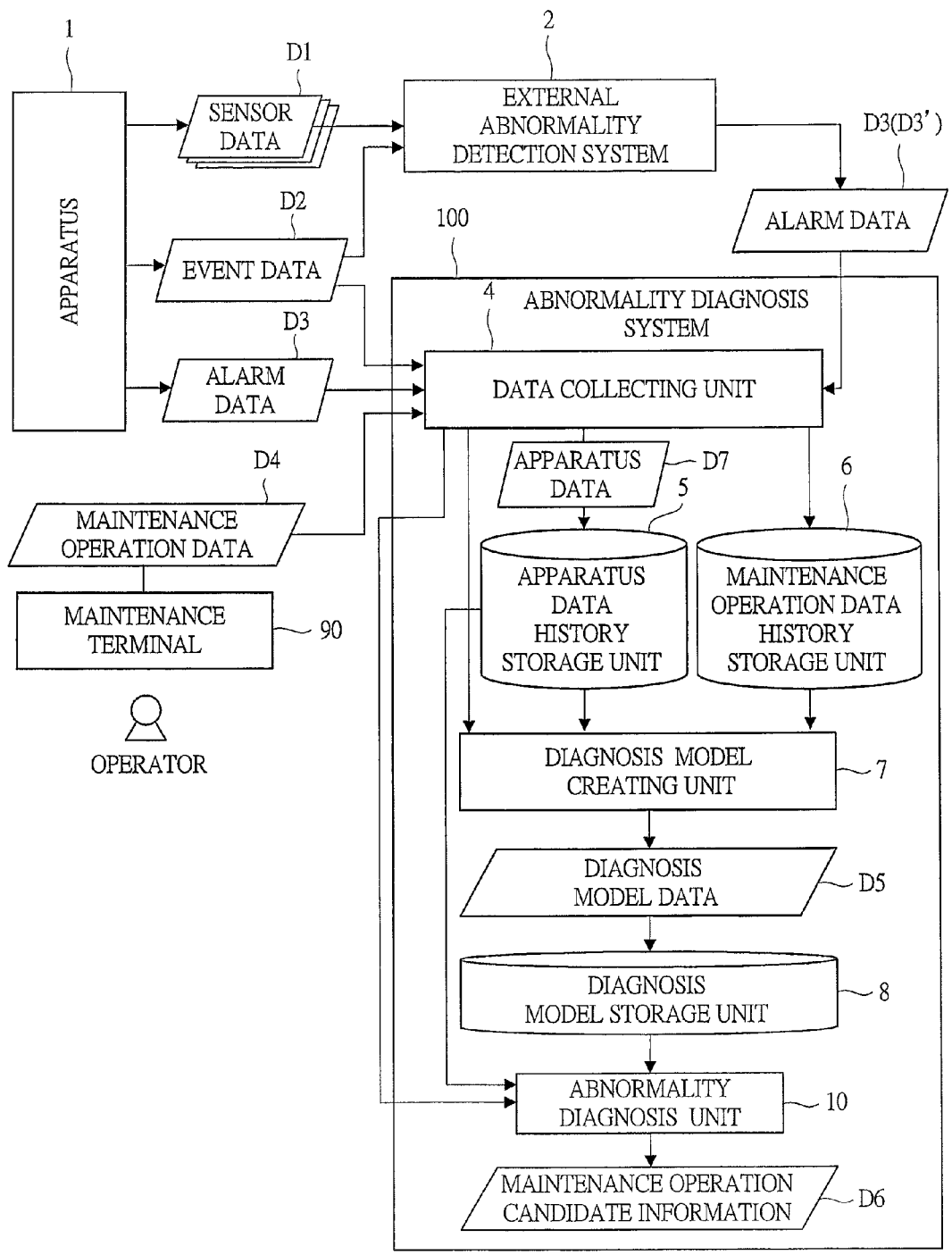
FIG. 1 is a diagram depicting a block structure of an information processing system (including an abnormality diagnosis system) in an embodiment of the present invention.

In the system of the present embodiment, in summary, in a structure as depicted in FIG. 1, in a process of creating an diagnosis model targeted for an apparatus 1 (FIG. 5), a structured abnormality model having a graph network structure among data of maintenance operations, apparatus events, and alarms is created (such as S104 and FIG. 7) to update an old model (S106). Also, in a process of diagnosing an abnormality of the apparatus 1 by using the diagnosis model (FIG. 6), structured abnormality data (S203) created from the data of maintenance operations, apparatus events, and alarms is extracted in a predetermined unit of time from within the model (S204), and a maintenance operation candidate information is output (S205).

<System>

FIG. 1 depicts a block structure of an information processing system (including an abnormality diagnosis system) of the present embodiment. The present information processing system includes the apparatus 1, an external abnormality detection system (a sensor data condition detection system) 2, and an abnormality diagnosis system 100. In addition, the present information processing system has a maintenance terminal 90 and others that are used by a maintenance operator. The information processing system of the present embodiment is configured mainly of the abnormality diagnosis system 100. The abnormality diagnosis system 100 includes functions of performing a process including an apparatus diagnosis model creating process and an apparatus abnormality diagnosis process with the predetermined apparatus (such as equipment) 1 as a target. The abnormality diagnosis system 100 is configured of one or more computers or the like. The computer is a general computer including, for example, a processor, a memory, a communication interface (a data operating unit), and others, and is used by an administrator of the present system.

The abnormality diagnosis system 100 includes a data collecting unit 4, an apparatus data history storage unit 5, a maintenance operation data history storage unit 6, a diagnosis model creating unit 7, a diagnosis model storage unit 8, an abnormality diagnosis unit 10, and others. Each function is achieved by, for example, a processor executing a program on a memory. Each storage unit is achieved by, for example, a database.

The apparatus 1 outputs a plurality of pieces of sensor data D1, apparatus event data D2, alarm data D3, and others. The apparatus 1 is a single apparatus in FIG. 1, and has a plurality of sensors mounted thereon (incorporated or externally installed therein).

The external abnormality detection system 2 performs a process of detecting a sign of abnormality or an abnormality based on an input (a collection) of data (the plurality of pieces of sensor data D1 and the apparatus event data D2) from the apparatus 1, thereby outputting data, such as alarm data D3 (D3'). Note that the alarm data D3 from the apparatus 1 and the alarm data D3 (D3') from the abnormality detection system 2 are of the same type of information.

Also, the maintenance operation data D4 is provided as information representing actual maintenances and details on the apparatus 1. For example, the maintenance operation data D4 is input to the maintenance terminal 90 for use by an operator for maintenance of the apparatus 1.

The data collecting unit 4 collects data, such as the maintenance operation data D4, the alarm data D3, and the apparatus event data D2. The apparatus data history storage unit 5 stores apparatus data D7 (such as the alarm data D3 and the apparatus event data D2) and their histories. The maintenance operation data history storage unit 6 stores the maintenance operation data D4 and its history. The diagnosis model storage unit 8 stores diagnosis model data D5.

The diagnosis model creating unit 7 creates a structured abnormality model between the alarms (D3) and the apparatus events (D2), and the maintenance operation types (D4) for newly-collected maintenance operation data D4, and update an (old) diagnosis model configured to include the previously-created (old) structured abnormality model. The diagnosis model creating unit 7 creates a first model, and also updates that model.

The data collecting unit 4 collects (at least one of) the alarm data D3 and/or the apparatus event data D2 output from the apparatus 1, and registers it in the apparatus data history storage unit 5. The data collecting unit 4 also collects the alarm data D3 (D3') output from the external abnormality detection system 2, and registers it in the apparatus data history storage unit 5. Furthermore, the data collecting unit 4 collects the maintenance operation data D4 created after a maintenance operation is performed on the apparatus 1, and registers it in the maintenance operation data history storage unit 6.

The external abnormality detection system 2 collects a plurality of pieces of sensor data D1 output from the apparatus 1, determines whether a sign of abnormality is present in the sensor data 1 through data processing using the sensor data D1 and a previously-set threshold and, when it is present, outputs alarm data D3 (D3'). For example, when the value of the sensor data D1 exceeds a set upper-limit threshold or falls below a lower-limit threshold, alarm data D3 (D3') is output from the external abnormality detection system 2. In this process of determining a sign of abnormality, a determination with a threshold may be performed on the result of a predetermined arithmetic operation, such as a standard deviation or an average value, after the sensor data D1 is collected.

When newly collecting maintenance operation data D4 via the data collecting unit 4, the diagnosis model creating unit 7 obtains history data of previous alarms (D3) and apparatus events (D2) regarding the relevant apparatus 1 from the data history storage unit 5. And, the diagnosis model creating unit 7 creates a structured abnormality model between the alarms (D3) and the apparatus events (D2), and the maintenance operation types (D4), updates the (old) diagnosis model, and registers the updated latest diagnosis model in the diagnosis model storage unit 8.

The apparatus data history storage unit 5 is connected to the data collecting unit 4, the diagnosis model creating unit 7, and the abnormality diagnosis unit 10, registering data transmitted from the data collecting unit 4 and delivering accumulated data upon request from the diagnosis model creating unit 7. As the apparatus data D7 of the apparatus data history storage unit 5, information data of at least one of the alarm data D3 and the apparatus event data D2 and others are included (FIG. 3). The alarm data D3 in this apparatus data D7 includes, for example, an apparatus ID, an alarm type, and a date and time of occurrence of alarm. Also, the apparatus event data D2 in this apparatus data D7 includes an apparatus ID, a type of operation state of the apparatus (type of apparatus event), and date and time of occurrence of operation of the apparatus (date and time of occurrence of an apparatus event).

The maintenance operation data history storage unit 6 is connected to the data collecting unit 4 and the diagnosis model creating unit 7, registering data transmitted from the data collecting unit 4 and delivering accumulated data upon request from the diagnosis model creating unit 7. As the maintenance operation data (history) D4 of the maintenance operation data history storage unit 6, for example, an apparatus ID, a date and time of the maintenance operation (starting and ending dates and times), a type of the maintenance operation, and a component number as a target for maintenance in that operation are included (FIG. 4).

The diagnosis model storage unit 8 is connected to the diagnosis model creating unit 7 and the abnormality diagnosis unit 10, registering the data D5 of an diagnosis model created in the diagnosis model creating unit 7. The diagnosis model is represented as, for example, graph network structure data representing structured abnormality between an apparatus event and an alarm type associated with a maintenance operation type. The diagnosis model includes, for each node in the graph network, a probability-of-occurrence data for all combinations of occurrence patterns among one or more nodes having an input relation to the relevant node and an occurrence patterns among one or more nodes having an output relation from the relevant node (such as FIG. 12). Note that the diagnosis model is formed of a synthesis of one or more structured abnormality models.

Also, the present system includes the abnormality diagnosis unit 10 engaging in an abnormality diagnosis process. The abnormality diagnosis unit 10 obtains information, such as one or more maintenance operation types, a target component number, and its probability of occurrence, and outputs them on a screen. The screen is a screen of a display apparatus included in the abnormality diagnosis system 100, the maintenance terminal 90, or the like, for example.

When newly obtaining alarm data D3 via the data collecting unit 4, the abnormality diagnosis unit 10 obtains, from the apparatus data history storage unit 5, history data (apparatus data D7) of previous alarms (D3) and apparatus events (D2) occurring within a predetermined time period, and creates an occurrence pattern of the alarms (D3) and the apparatus events (D2). And, the abnormality diagnosis unit 10 obtains, from the diagnosis model storage unit 8, the data D5 of the (old) diagnosis model of the relevant apparatus 1, obtains information about one or more maintenance operation types, target component numbers, and probabilities of occurrence matching the occurrence pattern this time from among those matching with the occurrence patterns of the alarm (D3) and the apparatus event (D2) this time, and outputs the information onto the screen as maintenance operation candidate information (maintenance detail instruction information) D6.

<Sensor Data>

FIG. 2 depicts an example of an output result of the sensor data D1 output from the apparatus 1. One or more (in this example, a plurality of) sensors mounted on the apparatus 1 outputs measurement results (state measurement values) in each sensor in a predetermined cycle. Examples of items of the sensor data D1 include an apparatus ID denoted as a, a date and time of measurement denoted as b, and measurement results (sensor data) denoted as c.

<Apparatus Data (Alarm Data and Apparatus Event Data)>

FIG. 3 depicts an example of an output result of the apparatus data D7 (history) including the alarm data D3 and the apparatus event data D2 of the apparatus 1. The apparatus event data D2 represents information regarding apparatus events (operation states) of the apparatus 1. The alarm data D3 represents information indicative of a sign of abnormality or an occurrence of an abnormality.

Examples of items of the alarm data D3 and the apparatus event data D2 in the apparatus data D7 (history) include an apparatus ID denoted as a, a date and time of occurrence denoted as b, a sensor data denoted as c, a code number denoted as d, and detail information denoted as e, and the like.

The date and time of occurrence (b) represents, for example, a date and time of occurrence of an alarm or a date and time of occurrence of an apparatus event. The sensor data (c) represents information for discriminating (determining) whether the type of relevant data (row) is, for example, the alarm data D3 or the apparatus event data D2 output from the apparatus 1 or the alarm data D3 (D3') output from the external abnormality detection system 2. In this example, "E" represents the apparatus event data (D2) output from the apparatus 1, "A" represents the alarm data D3 output from the apparatus 1, and "W" represents the alarm data D3 (D3') output from the external detection system. The code number (d) represents, for example, an alarm type or a type of an apparatus event. The code number (d) has a head character identical to the sensor data (c). With a numerical value such as "001" following that character, more details are defined. The detail information (e) is information representing, in text, details of an alarm or an apparatus event corresponding to the code number (d). There is an alarm and the like, for example, indicating that a value of the sensor data D1 does not fall within a range of normal thresholds. Apparatus events include power ON/OFF, start-up, stop, and others.

The alarm data D3 has alarm types including an alarm type of giving an alarm of a sign state (a sign of abnormality) before an apparatus abnormality occurs and an alarm type of outputting a state of (an instruction for) stopping the apparatus after an abnormality occurs. In this example, these alarm types are distinguished from each other based on the difference of a numerical value following a character indicative of a sensor data (c) in the code number (d). For example, "A001" indicates that a value exceeds an upper-limit threshold of a sensor A. "A002" indicates that a value falls below a lower-limit threshold of a sensor B. "A003" indicates that the apparatus 1 is to be stopped due to an occurrence of an abnormality in pressure of the apparatus 1.

Note that in the apparatus abnormality diagnosis process, the alarm data D3 and the apparatus event data D2 are not necessarily both required, and only one of them may suffice in some cases.

<Maintenance Operation Data>

FIG. 4 depicts an example of an output result of the maintenance operation data D4 (history) of the apparatus 1. Examples of items of the maintenance operation data D4 include an apparatus ID denoted as a, a date and time of occurrence of a maintenance operation denoted as b, an operator number denoted as c, an operation type denoted as d, an operation code number denoted as e, a component number denoted as f, and an operation detail information denoted as g, and the like.

The operation type (d) represents a type of a maintenance operation, such as a regular check or a troubleshooting. In this example, a character "C" represents a regular (for example, daily or weekly) and routine maintenance operation or confirmation operation. A character "T" represents a troubleshooting maintenance operation to be performed on an out-of-ordinary basis when a failure or a malfunction occurs in the apparatus 1. The operation code number (e) represents a type of each maintenance operation. The operation code number (e) has a head character identical to the operation type (d). With a numerical value such as "001" following that character, more details are defined.

The component number (f) represents a component number of a component as a target in a relevant maintenance operation. The operation detail information (g) is information representing, in text, maintenance operation details corresponding to that operation code number (e).

<Abnormality Analysis Model Creating Process Flow>

Figure 5:
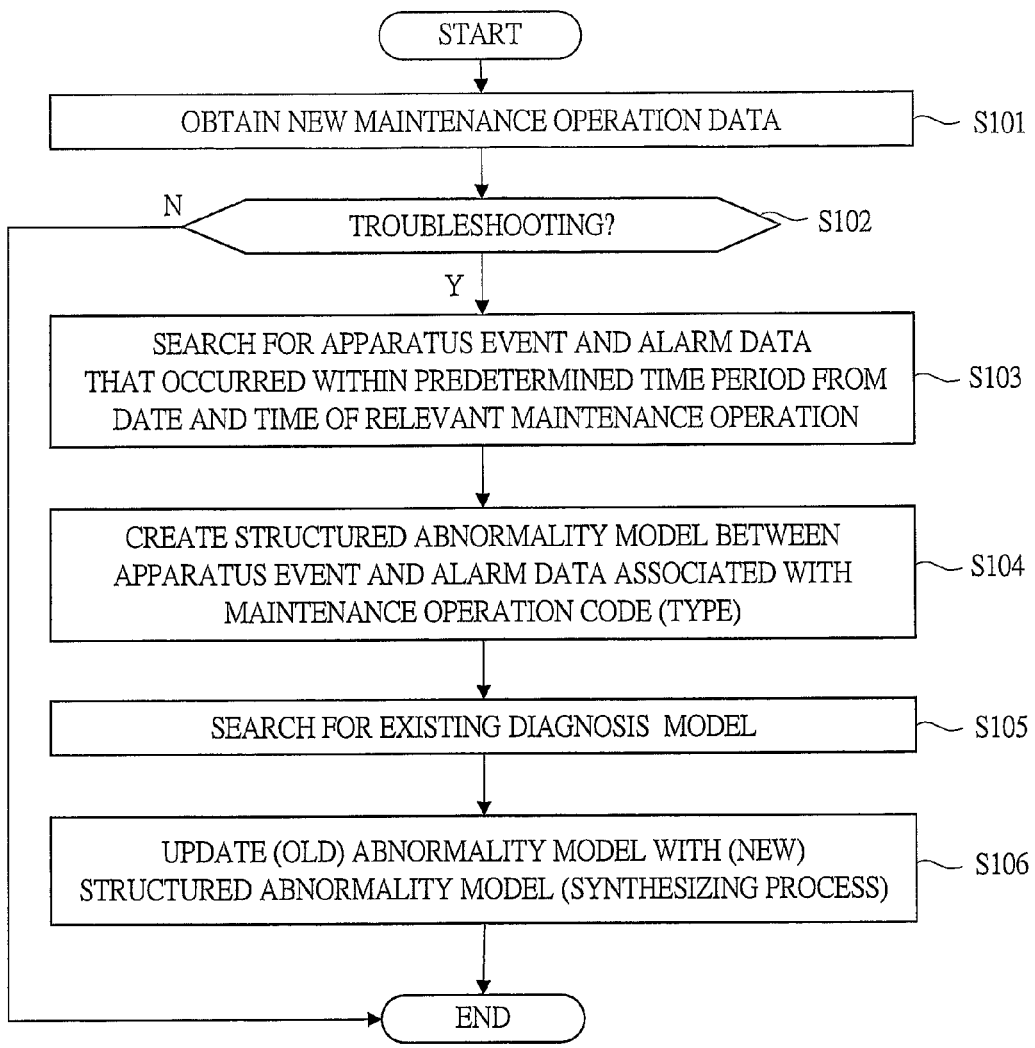
FIG. 5 is a flow diagram that depicts an diagnosis model creating method and process in the present abnormality diagnosis system.

FIG. 5 depicts a flow of an apparatus diagnosis model creating process in the present embodiment (S represents a process step).

Process subjects are the respective processing units of the abnormality diagnosis system 100 (mainly the diagnosis model creating unit 7).

First at S101, the diagnosis model creating unit 7 obtains the maintenance operation data D4 including an apparatus ID, dates and times of starting and ending a maintenance operation, a type of the maintenance operation, and a component number as a maintenance target in that operation.

At S102, the diagnosis model creating unit 7 determines whether the details of the maintenance operation data D4 obtained at S101 indicate a troubleshooting operation. This determination can be made by referring to the operation type (d) (or the operation code number (e)) in the maintenance operation data D4, and "T" mentioned above indicates a troubleshooting operation. When the maintenance operation data D4 obtained this time indicates a troubleshooting operation (Y), the procedure goes to S103. When the data indicates not a troubleshooting operation but a regular check, a confirmation operation, or the like (N), the process ends.

At S103, the diagnosis model creating unit 7 obtains alarm data D3 including an alarm type and a date and time of occurrence of the alarm of the relevant apparatus 1 and apparatus event data D2 including a type of an operation state and a date and time of occurrence of an apparatus operation of the apparatus 1 occurring within a predetermined time period from the date and time of the maintenance operation obtained this time (the time and date of occurrence (b) described above). Note that the alarm data D3 to be obtained here may include the alarm data D3 directly output from the apparatus 1 and also the alarm data D3' output from the external abnormality detection system 2.

At S104, by using the data obtained at S101 and S103 (D4, D3, and D2), the diagnosis model creating unit 7 creates a structured abnormality model representing a structured abnormality between an apparatus event and alarm type (the code number (d) described above) associated with the maintenance operation type (the operation code number (e) described above) with a graph network structure. A method of creating a structured abnormality model among these three pieces of information will be described in detail further below by using FIG. 12 and others.

At S105, by searching the diagnosis model storage unit 8, the diagnosis model creating unit 7 obtains an existing diagnosis model represented by a synthesis of a plurality of structured abnormality models regarding the relevant apparatus 1.

At S106, the diagnosis model creating unit 7 synthesizes the new structured abnormality model created at S104 described above with the existing (old) diagnosis model obtained at S105, recalculates a probability of occurrence among the updated nodes, and ends the process. The process of synthesizing structured abnormality models at S106 and the process of calculating a probability of occurrence among nodes will be described in detail further below by using FIG. 9 to FIG. 12 and others.

<Abnormality Analyzing Process Flow>

Figure 6:
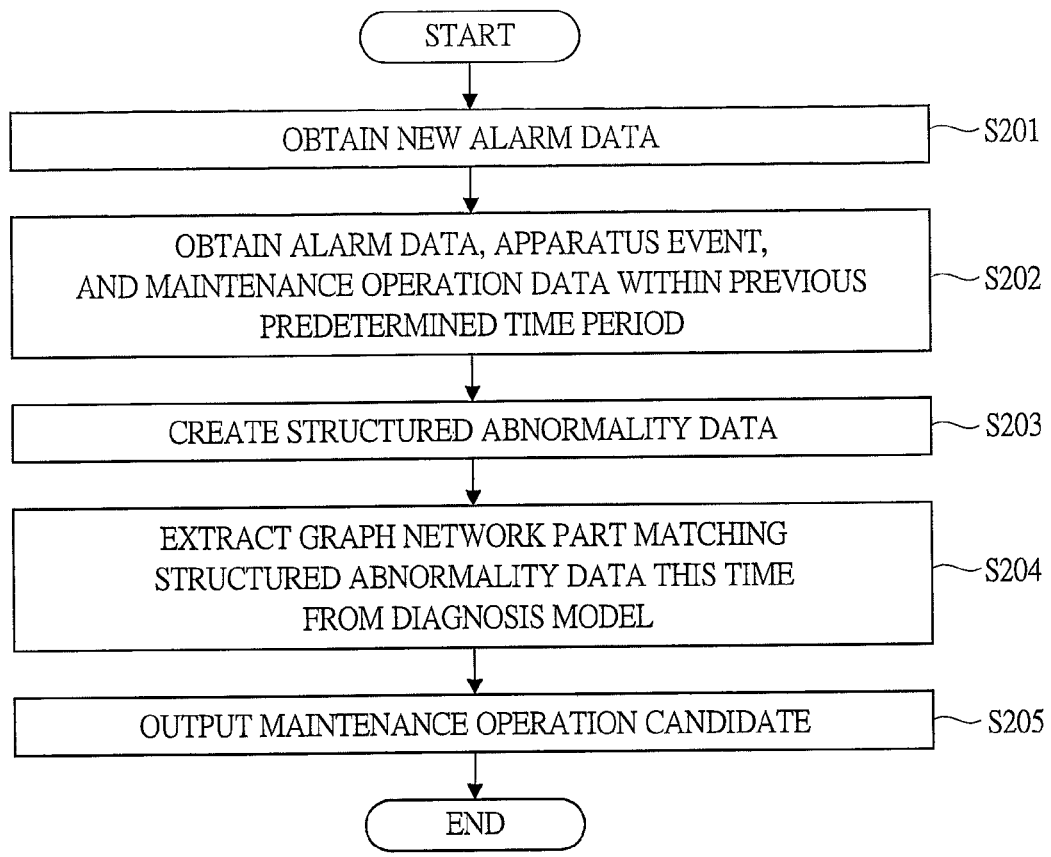
FIG. 6 is a flow diagram that depicts an apparatus abnormality diagnosis method and process using an diagnosis model in the present abnormality diagnosis system.

FIG. 6 depicts a flow of an apparatus abnormality diagnosis process according to the apparatus abnormality diagnosis method in the present embodiment. First at S201, the abnormality diagnosis unit 10 obtains the alarm data D3 (including the apparatus ID, the alarm type, and the date and time of occurrence of the alarm).

At S202, the abnormality diagnosis unit 10 obtains the alarm data D3, the apparatus event data D2 (including the type of an operation state of the apparatus and the date and time of occurrence of an apparatus operation), and the maintenance operation data D4 (including the date and time of starting and ending the maintenance operation and the type of the maintenance operation) occurring within a predetermined time period from the date and time of occurrence of the alarm data D3 obtained at S201.

At S203, based on the order of date and time of occurrence in the alarm data D3, the apparatus event data D2, and the maintenance operation data D4 obtained at S201 and S202, the abnormality diagnosis unit 10 creates structured abnormality data (will be described further below) representing an occurrence order pattern of alarms, apparatus events, and maintenance operation types at the time of occurrence of an alarm this time. Here, the number of pieces of structured abnormality data is not restricted to one, and a plurality of pieces are created according to combinations of the data (D2, D3, and D4) obtained at S202.

At S204, the abnormality diagnosis unit 10 extracts a graph network part matching one or more pieces of structured abnormality data created at S203 from within the (old) diagnosis model represented by a plurality of structured abnormality models. In this graph network part extracting process, a graph route (nodes and links) are searched in the relevant diagnosis model in the order of an occurrence pattern of alarms or apparatus events or maintenance operation types in the target structured abnormality data. Then, when a graph pattern portion whose route matches that of the structured abnormality data is present in the relevant diagnosis model and a node as an output destination from a last node is a maintenance operation type, that is, with this case being taken as an extraction condition, a graph network part matching the structured abnormality data is extracted.

Each node of the diagnosis model has probability-of-occurrence data (for example, 801) corresponding to a combination of nodes (for example, A01, E01, A01→E01) having an input relation to a relevant node (for example, A02) and a combination of nodes (for example, T01, T02, and T03) having an output relation from the relevant node. Therefore, a probability of occurrence of target structured abnormality data can be calculated.

At S205, the abnormality diagnosis unit 10 uses the data of the graph network part of the diagnosis model matching the structured abnormality data this time extracted at S204 to output information (maintenance operation candidate information D6) including, for each piece of structured abnormality data this time, a maintenance operation type to be handled, a target component number, a probability of occurrence, and others.

<Structured abnormality Model and Abnormality Analysis Model>

Figures 7, 8:
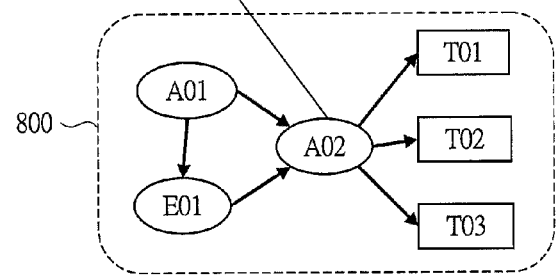
FIG. 7 is a drawing that depicts an example of an diagnosis model representing a structured abnormality between a maintenance operation type, and an apparatus event and an alarm type (in the case of an A02 node) in the present abnormality diagnosis system.
FIG. 8 is a drawing that depicts an example of an abnormality diagnosis process result in the abnormality diagnosis system.

FIG. 7 depicts an example of an diagnosis model representing structured abnormality among an apparatus event, an alarm type, and a maintenance operation type. For simplification, the case of an diagnosis model configured to include only a structured abnormality model regarding one node is shown, but the same goes for the case of an diagnosis model configured of a synthesis of a plurality of structured abnormality models. In this example, an diagnosis model 800 including a structured abnormality model regarding an "A02" node and probability-of-occurrence data (table) 801 regarding the "A02" node are shown.

Nodes each surrounded by a circular frame each represent an alarm type or an apparatus event type. Nodes each surrounded by a rectangular frame represent a maintenance operation type. Here, a code number starting with a node label "A" represents an alarm type. A code number starting with a node label "E" represents an apparatus event type. A code number starting with a node label "T" represents a maintenance operation type (troubleshooting) (similarly to codes in FIG. 3 and FIG. 4). Links indicated by arrows among respective nodes each have structured abnormality between nodes, with a node as an arrow origin influencing a node as an arrow destination.

In this example, in the structured abnormality model (800), "A02" has an input relation with "A01" and "E01", and has an output relation with "T01", "T02", and "T03". Also, as shown in the table (801), "A02" includes probability-of-occurrence data corresponding to a combination of a node having an input relation and a node having an output relation. According to this table (801), when "A02" occurs after "A01" (a row of input "A01"), a probability with which an operation "T01" was performed is "0.6", and a probability with which an operation "T02" was performed is "0.4". Also similarly, when "A02" occurs after "E01" (a row of input "E01"), a probability of occurrence of "T01" is "0.5", and a probability of occurrence of "T03" is "0.5". Furthermore, when "A02" occurs after "E01" after "A01" (a row of input "A01→E01"), a probability of occurrence of "T01" is "0.3", a probability of occurrence of "T02" is "0.3", and a probability of occurrence of "T03" is "0.4". Still further, when "A02" singly occurs (a row of input "–" (none)), a probability of occurrence of "T02" is "0.8", and a probability of occurrence of "T03" is "0.2".

The structured abnormality data created at S203 described above shows a combination relation regarding an alarm or an occurrence pattern (in other words, an occurrence order pattern of alarms, apparatus events, and maintenance operation types regarding the apparatus 1). In the example of FIG. 7, in structured abnormality data regarding "A02" node (a second alarm), when "A01" node (a first alarm) is taken as an input, for example, an output is "T01" node or "T02" node (table (801): a row of input "A01").

<Abnormality Analysis Results>

FIG. 8 depicts an example (analysis result information 900) of an apparatus abnormality diagnosis result in the process (FIG. 6) of the abnormality diagnosis unit 10 according to the present diagnosis method. The analysis result information 900 has structured abnormality data denoted as a, a probability of occurrence denoted as b, a maintenance operation code denoted as c, an operation detail denoted as d, and a target component number denoted as e.

In this example, according to the structured abnormality data denoted as a, alarms occur in the order of "A01"→"A02". Based on the diagnosis model 800 depicted in FIG. 7, as a result of extracting a graph network part matching the structured abnormality data (a) of this time (S204, table (801) : a row of input "A01"), "T01" and "T02", which are operation codes (c) indicating operations to be handled, and "0.6" and "0.4", which are probabilities of occurrence (b) of these operations, are output as information. Also, information about operation details (d) associated one-to-one with each maintenance operation code (c) and information about the target component number (e) are also output simultaneously. For example, "T01" indicates component replacement of the apparatus 1, and its target component number is "P001". Further, information is output with a larger probability of occurrence (b) of "0.6" first. These pieces of output information are transmitted as maintenance operation candidate (list) information D6 from, for example, the abnormality diagnosis unit 10 to the maintenance terminal 90 for display on the screen. The operator can view the information on the screen and soon determine that there is a high possibility that component replacement of, for example, "T01", is effective as a maintenance operation, and can efficiently perform an operation.

<Apparatus Example>

Figure 9:
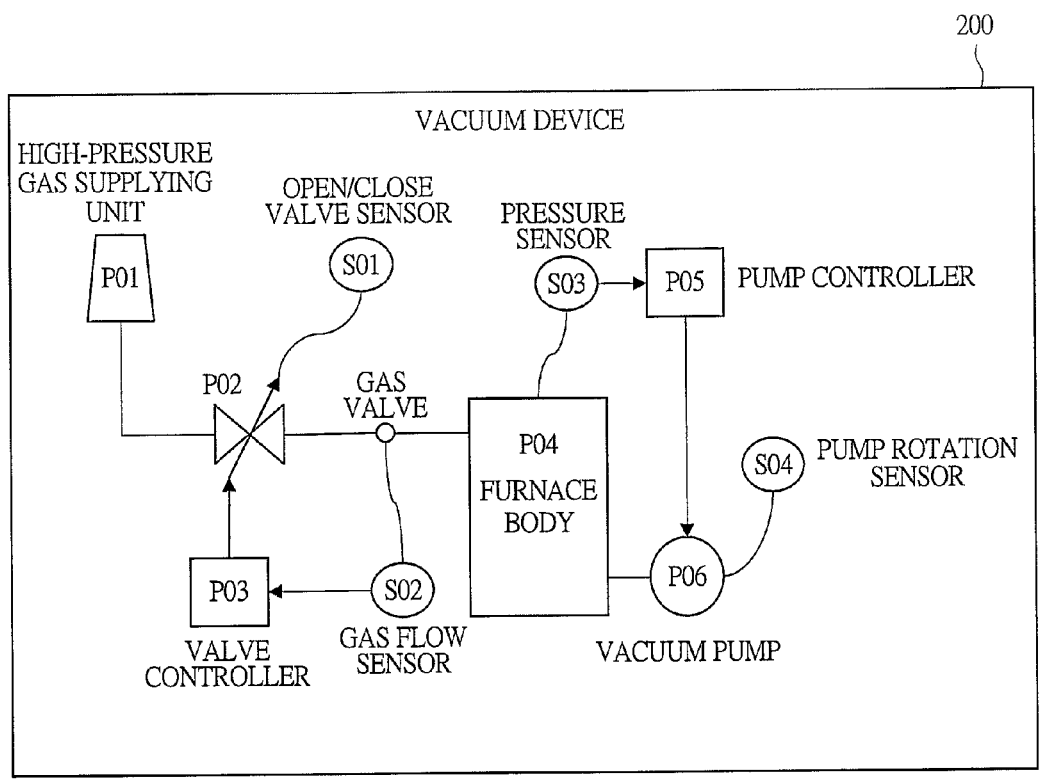
FIG. 9 is a drawing that depicts a schematic structure of an apparatus (a vacuum apparatus) for use as a case in the present abnormality diagnosis system.

FIG. 9 depicts a schematic structure of a vacuum apparatus (system) 200 for use as a case of the apparatus 1 as a target in the present embodiment. The vacuum apparatus 200 is configured of six types of elements (components) from P01 to P06 and four types of sensors from S01 to S04. P01: high-pressure gas supplying unit, P02: gas valve, P03: valve controller, P04: furnace body, P05: pump controller, P06: vacuum pump, S01: open/close valve sensor, S02: gas flow sensor, S03: pressure sensor, S04: pump rotation sensor.

As a basic operation, with the high-pressure gas supplying unit (P01), the gas valve (P02), and the valve controller (P03), a predetermined gas flow is fed into the furnace body (P04), and air is exhausted from the inside of the furnace body (P04). A main function of each element is described below.

The high-pressure gas supplying unit (P01): High-pressure gas is supplied to the furnace body (P04).

The gas valve (P02): With an instruction from the valve controller (P03), an open/close part of the gas valve (P02) is controlled, thereby controlling the flow of gas to be supplied from the high-pressure gas supplying unit (P01) to the furnace body (P04). The gas valve (P02) is provided with the open/close valve sensor (S01), measuring the open/close degree of the valve.

The valve controller (P03): An open/close amount of the gas value (P02) is calculated so that a gas flow flowing into the furnace body (P04) to be measured by the gas flow sensor (S02) has a predetermined value, and an instruction for adjusting an open/close degree is made to the gas valve (P02).

The furnace body (P04): With the high-pressure gas supplying unit (P01), the gas valve (P02), and the valve controller (P03), a predetermined gas flow is fed, and air is exhausted with the pump controller (P05) and the vacuum pump (P06) so that a degree of vacuum in the furnace body (P04) is constant. The furnace body (P04) includes the pressure sensor (S03), measuring the pressure in the furnace body (P04).

The pump controller (P05): The number of pump revolutions with which the pressure in the furnace body (P04) measured by the pressure sensor (S03) has a predetermined pressure is calculated, and an instruction is issued to the vacuum pump (P06).

The vacuum pump (P06): Air in the furnace body (P04) is exhausted with an output under an instruction from the pump controller (P05). The vacuum pump (P06) is equipped with a pump rotation sensor (S04), measuring the number of revolutions of the vacuum pump (P06).

<Abnormality Cases>

FIG. 10 depicts abnormality cases in the vacuum apparatus 200 of FIG. 9. In each abnormality case (a row denoted as No.), an abnormality mode (a), a phenomenon (b), an abnormality cause (c), and an diagnosis model (d) are shown. In this example, a total of seven cases are described: three cases (No. 1 to No. 3) of gas flow abnormality (the abnormality mode (a): "abnormality in gas flow") and four cases (No. 4 to No. 7) of pressure control abnormality of the furnace body (the abnormality mode (a): "abnormality in furnace body pressure control"). Note that the abnormality cases shown here do not cover all failure modes (abnormality modes) that can occur in the vacuum apparatus.

Regarding a gas flow abnormality, in case 1 (No. 1), as the phenomenon (b), after the valve open/close degree (a value of S01) exceeds a maximum value, an alarm occurred indicating that the gas flow (a value of S02) did not satisfy a predetermined value. As a result of investigation and operation, a shortage of supplied pressure in the high-pressure gas supplying unit (P01) was found as the cause for abnormality (c). The diagnosis model (d) of case 1 is represented as "S01→S02→P01". Note that in this diagnosis model (d), the direction of an arrow (→) corresponds to a flow of process (a cause is estimated from a phenomenon to output operations). Based on the phenomena of arrow origins (S01→S02), operations corresponding to the cause for abnormality (P01) of an arrow destination (P01) are shown.

Similarly, in case 2 (No. 2), an alarm occurred when the gas flow (a value of S02) exceeds a predetermined value although the valve open/close degree (a value of S01) is 0, that is, the valve is closed. The cause was a leakage from the gas valve (P02). The diagnosis model is "S01→S02→P02". In case 3 (No. 3), an alarm occurred indicating that the gas flow (a value of S02) did not satisfy a predetermined value, and the cause was an abnormality of the valve controller (P03). The diagnosis model is "S02→P03".

Also, regarding a furnace body pressure control abnormality, in case 4 (No. 4), an alarm occurred indicating that the pressure of the furnace body (a value of S03) exceeds an upper-limit value. The cause was an abnormality of the valve controller (P03). The diagnosis model is "S03→P03".

Similarly, in case 5 (No. 5), an alarm occurred indicating a shortage of a furnace-body pressure (a value of S03) after the number of pump revolutions (a value of S04) exceeded a maximum value (an upper-limit value). The cause was a vacuum leakage from the furnace body (P04). The diagnosis model is "S04→S03→P03". In case 6 (No. 6), an alarm occurred indicating a shortage of a furnace-body pressure (a value of S03). The cause was an abnormality of the pump controller (P05). The diagnosis model is "S03→S05". In case 7 (No. 7), an alarm occurred indicating that a shortage (abnormality) of the furnace-body pressure (a value of S03) after the number of pump revolutions (a value of S04) exceeded a maximum value (an upper-limit value). The reason was a shortage of exhaustion of air associated with deterioration in the vacuum pump (P06). The diagnosis model is "S04→S03→P06".

<Example of Abnormality Analysis Model>

Figure 11:
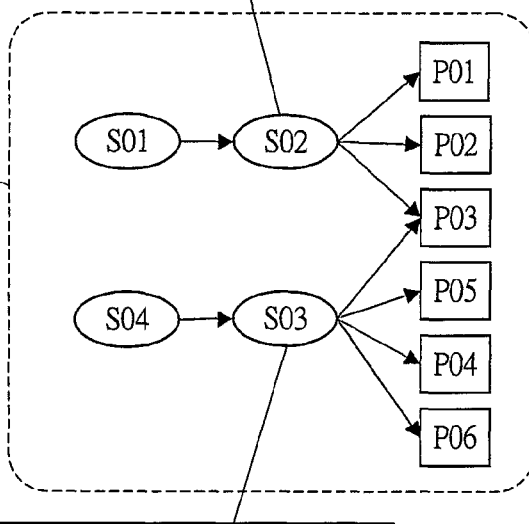
FIG. 11 is a drawing that depicts an diagnosis model created from the abnormality cases of FIG. 10.

FIG. 11 depicts a result of creating an diagnosis model created from the abnormality cases of the vacuum apparatus 200 of FIG. 10. For each of the seven types of abnormality cases described in FIG. 10, a structured abnormality model between an alarm of each of the sensors (S01 to S04) and target components (P01 to P06) is created. With a process of synthesizing these seven structured abnormality models, an diagnosis model for the entire vacuum apparatus 200 can be created.

In an diagnosis model 1200 of this example, with a combination of alarm occurrence patterns (structured abnormality data), nodes of the gas flow sensor (S02) and the furnace-body pressure sensor (S03) are each equipped with a table (1201, 1202) of a probability-of-occurrence data according to an input/output relation. In the case of the gas flow sensor (S02), when an alarm of the gas flow sensor (S02) occurs after the valve open/close degree (a value of S01), an output is made, indicating that a probability that the high-pressure gas supplying unit (P01) becomes abnormal is "0.5" and a probability that the gas valve (P02) becomes abnormal is "0.5". Also, when only an alarm of the gas flow sensor (S02) occurs, an output is made, indicating that a probability that the valve controller (P03) becomes abnormal is "1".

Also, in the pressure sensor (S03) of the furnace body (P04), when an alarm of the pressure sensor (S03) occurs after the pump rotation sensor (S04), an output is made, indicating that a probability that the furnace body (P04) becomes abnormal is "0.5" and a probability that the vacuum pump (P06) becomes abnormal is "0.5". Also, when only an alarm of the pressure sensor (S03) occurs, an output is made, indicating that a probability that the valve controller (P03) becomes abnormal is "0.5" and a probability that the pump controller (P05) becomes abnormal is "0.5".

<Example of Abnormality Analysis Model>

FIG. 12 depicts a detailed flow of a process of creating a structured abnormality model among a maintenance operation, an alarm, and an apparatus event type at process step S104 of the diagnosis model creating method of FIG. 5.

First at S301, the diagnosis model creating unit 7 obtains a history (D4) of the previous maintenance operation data in the relevant apparatus 1. Next at S302, from among the history (D4) of the maintenance operation data obtained at S301, maintenance operation data of troubleshooting to be performed on an out-of-ordinary basis is extracted. This troubleshooting (maintenance operation) maintenance operation is not a regular (for example, daily or weekly) or routine maintenance operation or confirmation operation, but is performed on an out-of-ordinary basis when a failure or a malfunction occurs in the apparatus 1. Then, the diagnosis model creating unit 7 obtains (extracts) a maintenance operation type and its date and time of occurrence data in the extracted maintenance operation data. Here, as described above, the maintenance operation type (classification) can be discriminated based on the head character of the operation type (d) data or the operation code number (e) of the maintenance operation data D4 ("T" indicating a troubleshooting maintenance operation).

At S303, the diagnosis model creating unit 7 uses the maintenance operation data extracted at S302 and indicating that the troubleshooting was performed, and creates transition data of the number of times of occurrence for each maintenance operation type at predetermined time intervals. For example, one day is taken as a time interval for counting the number of times of occurrence.

Next at S304, the diagnosis model creating unit 7 obtains a history (the apparatus data (history) D7) of previous alarm data and apparatus event data in the relevant apparatus 1.

At S305, transition data of the number of times of occurrence for each alarm and apparatus event type at predetermined time intervals is created by using the data (D7) obtained at S304. The time interval for counting the number of times of occurrence is required to be the same as the time interval used in the transition data of the number of times of occurrence for each maintenance operation type at S303.

At S306, the diagnosis model creating unit 7 uses the transition data of the number of times of occurrence for each maintenance operation type created at S303 and the transition data of the number of times of occurrence for each alarm and apparatus event type created at S305, and calculates a correlation coefficient (a correlation) of the transition data of the number of times of occurrence between the maintenance operation type and the alarm and apparatus event type.

At S307, from the correlation coefficient calculated at S306, the diagnosis model creating unit 7 extracts a correlation satisfying a predetermined threshold and creates a graph network (a graph network model) between the maintenance operation type and the alarm and apparatus event type. Here, as a determination criterion using the threshold above, a correlation satisfying a condition of [an absolute value of a correlation coefficient between two data types]>[threshold] is extracted.

At S308, the diagnosis model creating unit 7 makes a structured computation of the graph network between maintenance operation types and alarm and apparatus event types created at S307, and extracts a group of nodes as a closed-circuit relation (will be described further below).

At S309, regarding the group of the nodes (the maintenance operation type and the alarm and apparatus event type) as a closed-circuit relation extracted through the structured computation of the graph network at S308, the diagnosis model creating unit 7 uses the date and time of occurrence of each data to set a directivity of each node in that group in the order of time course, thereby creating a structured abnormality model between the maintenance operation type and the alarm and apparatus event type.

<Transition Data of the Number of Times of Occurrence>

Figure 13:
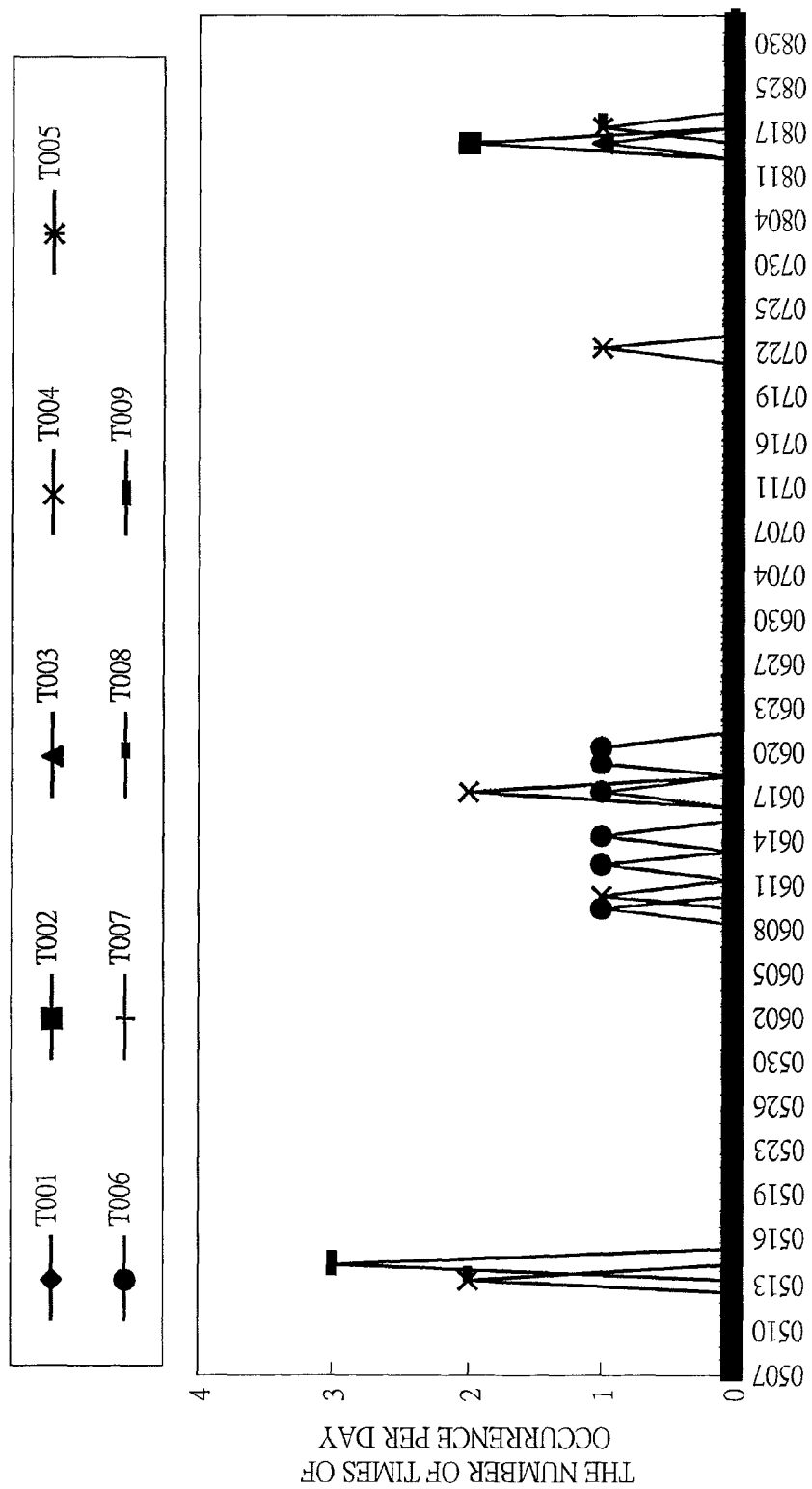
FIG. 13 is a drawing that depicts an example of transition data of the number of times of occurrence for each maintenance operation type in the present abnormality diagnosis system.

FIG. 13 depicts an example of transition data of the number of times of occurrence for each maintenance operation type. Here, the number of times of occurrence per day is counted. Here, transitions of the number of times of occurrence of nine maintenance operation types from "T001" to "T009" are shown.

Figure 14:
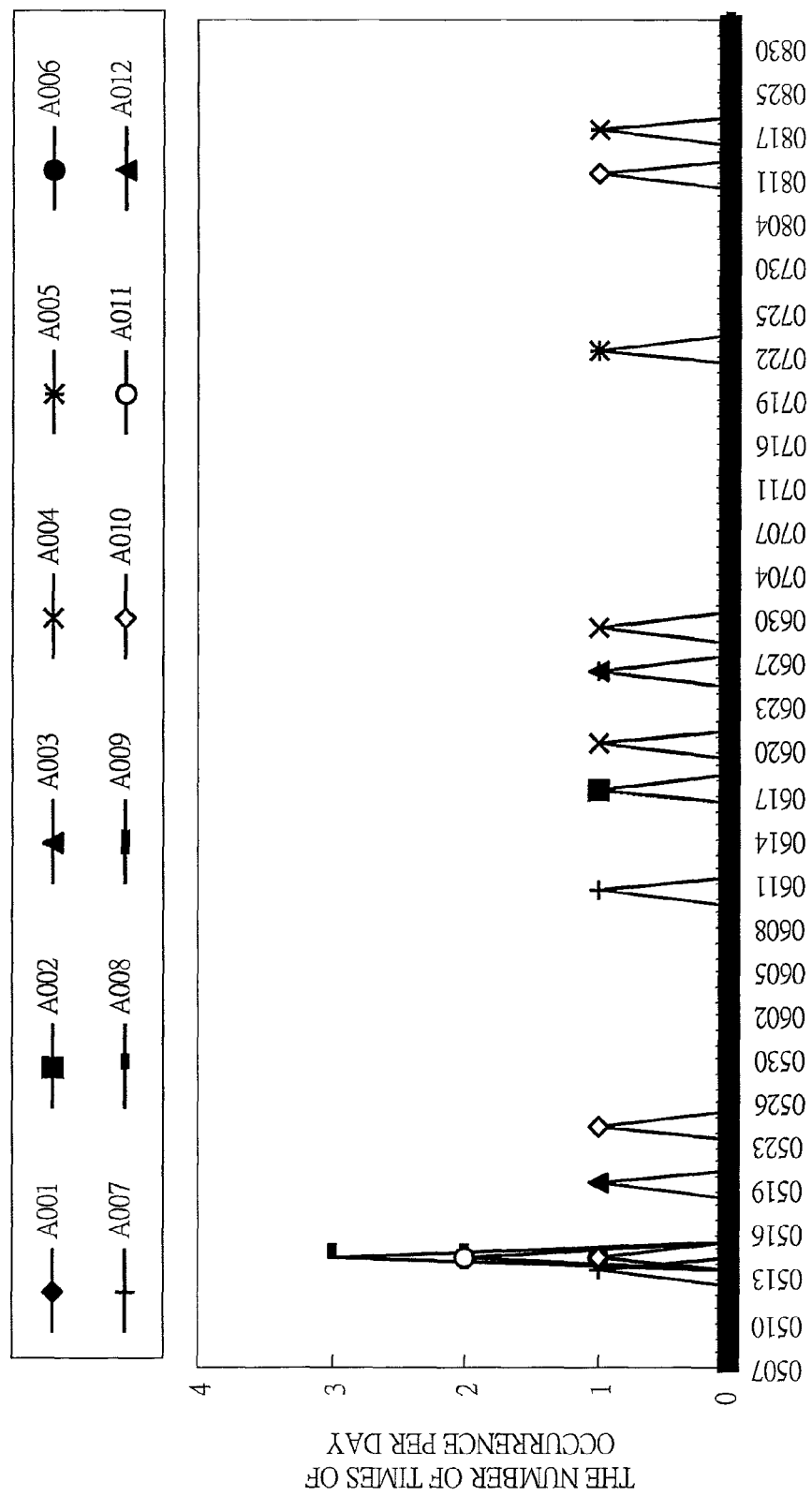
FIG. 14 is a drawing that depicts an example of transition data of the number of times of occurrence for each alarm type in the present abnormality diagnosis system.

FIG. 14 depicts an example of transition data of the number of times of occurrence for each alarm type. Here, the number of times of occurrence per day is counted. Here, transitions of the number of times of occurrence of twelve maintenance operation types from "A001" to "A012" are shown.

Figure 15:
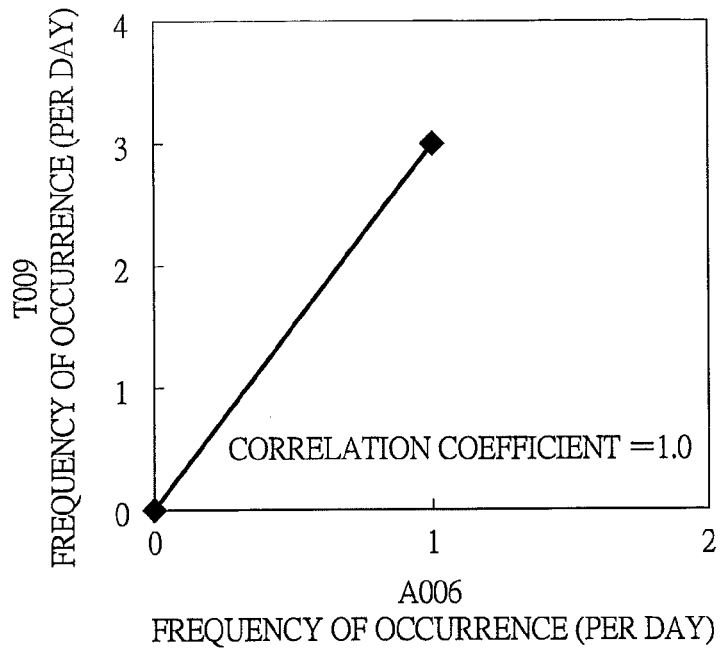
FIG. 15 is a correlation diagram between transition data of the number of times of occurrence of a maintenance operation type "T009" in FIG. 13 and transition data of the number of times of occurrence of an alarm type "A006" in FIG. 14.

FIG. 15 is a correlation diagram between transition data of the number of times of occurrence of the maintenance operation type "T009" of FIG. 13 and transition data of the number of times of occurrence of the alarm type "A006" of FIG. 14. A correlation coefficient between "T009" and "A006" is "1.0", which is high, and it can be known that "T009" and "A006" simultaneously occur at a time interval as the same counting unit.

Figure 16:
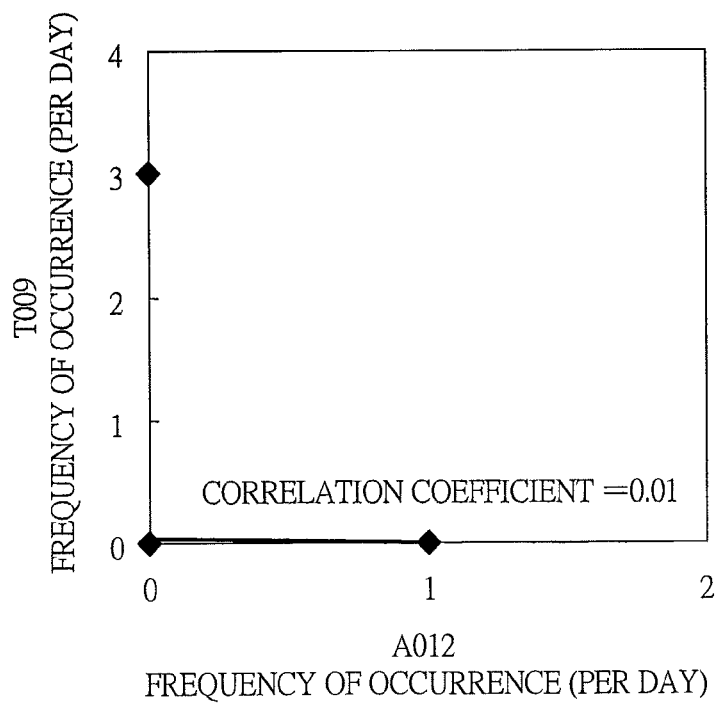
FIG. 16 is a correlation diagram between transition data of the number of times of occurrence of a maintenance operation type "T009" in FIG. 13 and transition data of the number of times of occurrence of an alarm type "A012" in FIG. 14.

FIG. 16 is a correlation diagram between transition data of the occurrence of the maintenance operation type "T009" of FIG. 13 and transition data of the occurrence of the alarm type "A012" of FIG. 14. A correlation coefficient between "T009" and "A012" is "0.01", which is low, and it can be known that "T009" and "A012" do not simultaneously occur at a time interval as the same counting unit.

<Graph Network>

Figure 17:
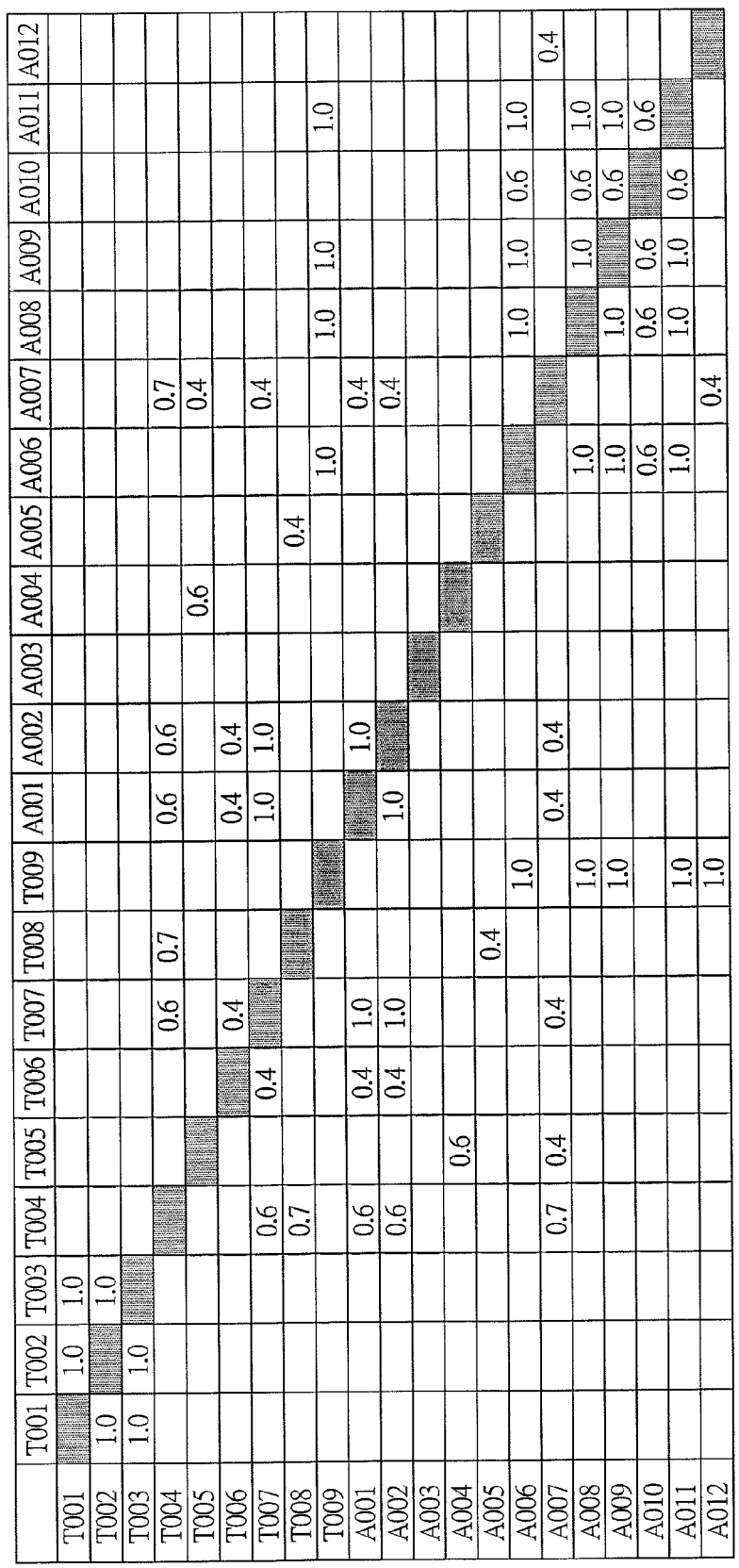
FIG. 17 is a drawing that depicts a graph network between maintenance operation types and alarm types created from the transition data of the number of times of occurrence for each maintenance operation type of FIG. 13 and the transition data of the number of times of occurrence for each alarm type of FIG. 14.

FIG. 17 depicts a graph network (table) between a maintenance operation type and an alarm type created from the transition data of the number of times of occurrence for each maintenance operation type of FIG. 13 and the transition data of the number of times of occurrence for each alarm type of FIG. 14. At S307 of FIG. 12 described above, data of the graph network (table) of FIG. 17 is created.

Characters on the vertical and horizontal axes represent the maintenance operation types "T001" to "T009" and the alarm types "A001" to "A012". In this example, only relations in which an absolute value of a correlation coefficient between a maintenance operation and an alarm type is equal to or greater than "0.4" are output (shown). Numerals in rows and columns each indicates an absolute value of the correlation coefficient between an item on the vertical axis and an item on the horizontal axis. For example, a numeral of a matrix element where the maintenance operation type ""T009" and the alarm type "A006" cross is "1.0" (FIG. 15). Also, this matrix has a symmetrical structure with respect to a diagonal matrix.

FIG. 18 depicts a graph network after a structured computation is made on the graph network between maintenance operation types and alarm types of FIG. 17 (note that this structured computation is a calculating process serving as a necessary element of this characteristic). At S308 of FIG. 12 described above, data of this FIG. 18 is created. In the structured computation of this example, by rearranging the matrix of FIG. 17, three independent groups (G1, G2, and G2) of maintenance operation types and the alarm types are created. The group G1 is comprised of "T001", "T002", and "T003", which have a strong correlation with each other. The group G2 is comprised of "T009", "A006", "A008", "A009", "A010", and "A011". In G2, a correlation is not observed among all data items, but is observed among many items. The group G3 is comprised of the remaining maintenance operation types and alarm types ("T004", "T007", "T008", "A005", "T006", "A001", "A002", "A007", "A012", "T005", and "A004").

FIG. 19 depicts data relating to dates and times of occurrence of maintenance operation types and alarm types belonging to the group G2 of the graph network of FIG. 18 after a structured computation. The data is shown correspondingly to error codes (alarm types) in the order of date and time of occurrence. In this example, the maintenance operation type "T009" and the alarm types "A006" and "A008" to "A011" belonging to G2 occur in the order of A008→A009→A011→T009→A006→A010.

FIGS. 20A and 20B depict structured abnormality models before and after setting directivity regarding data of the maintenance operation types and the alarm types belonging to the group G2 of the graph network of FIG. 18 after a structured computation. In which, FIG. 20A depicts a structured abnormality before setting directivity between the maintenance operation types "T009" and the alarm types "A006" and "A008" to "A011". This representation in FIG. 20A is equivalent to the matrix representation of G2 in FIG. 18. Note that solid-line arrows (oriented to both directions) correspond to a correlation coefficient of "1.0" and broken-line arrows (oriented to both directions) correspond to a correlation coefficient of "0.6".

Also, FIG. 20B depicts a structured abnormality after setting directivity, showing the result with directivities between nodes in FIG. 20A are set in the order of the date and time of occurrence in FIG. 19. In FIG. 20B, a closed-circuit relation observed before setting directivity is eliminated, and the result becomes a structured abnormality model representing alarm types and maintenance operation types. By setting directivity, the orientation of each arrow is one direction. In this example, "A009" or "A011" occurs from "A008", "T009" occurs from these, "A006" occurs from "T009", and "A010" occurs from "A006".

<Structured Computation>

FIG. 21 depicts a detailed flow of a process of making a structured computation of a graph network at S308 in the structured abnormality model creating process of FIG. 12 described above. First at S401, in a graph network having directivity, the diagnosis model creating unit 7 extracts graph nodes without having a closed-circuit relation with other graph nodes. Here, the closed-circuit relation means that there is a route in a graph network starting from a node as a starting point and returning to the node as the starting point. The route may start and then go through a plurality of nodes.

At S402, from the graph nodes extracted at S401, the diagnosis model creating unit 7 puts a graph node without having input data first in order in target graph nodes.

At S403, from the graph nodes extracted at S401, the diagnosis model creating unit 7 puts a graph node without having output last in order in the target graph nodes.

At S404, the diagnosis model creating unit 7 excludes the graph nodes sequenced at S402 and S403 from process targets, and updates the graph network in an excluded state.

At S405, the diagnosis model creating unit 7 checks to see whether a graph node without having a closed-circuit relation and without having input output data is present among the process-target graph nodes. When a graph node satisfying this determination criterion is not present (N), the process ends. On the other hand, when such a graph node is present (Y), S406 is performed.

At S406, the diagnosis model creating unit 7 extracts graph node groups having a closed-circuit relation in the graph network updated at S404, and replaces these graph node groups with one graph node. Then, the procedure returns to S401 for performing the process.

Also, the present system includes a function of displaying information about the diagnosis models (structured abnormality model), the graph network, and others in FIG. 7 (FIG. 11), FIG. 17 (FIG. 18), FIG. 20, and others on the screen as required. For example, the administrator of the abnormality diagnosis system 100 can confirm the information as being displayed on the screen, and can use this information for instructing the operator for operation and maintenance and others.

As has been described in the forgoing, according to the present embodiment, provided is a function of collecting or obtaining output information from the apparatus 1 or the like (such as the sensor data D1, the apparatus event data D2, and the alarm data D3) and the maintenance operation data D4 in a predetermined unit of time, representing causalities between these pieces of data as structured abnormality models with graph network models, and sequentially updating an diagnosis model for its entirety by synthesizing the structured abnormality models. For this reason, an abnormality handing result newly occurring with a maintenance operation and others can be easily reflected onto the diagnosis model. Therefore, the diagnosis model can be easily created and updated for a failure case and, by using this model, it is possible to appropriately and efficiently achieve an abnormality diagnosis of the apparatus 1 and instructions for troubleshooting and maintenance (such as a component candidate). Also, even when the number of apparatuses 1 to be handled is large, an abnormality diagnosis can be efficiently made. Furthermore, a statistical process can contribute to clarification of a failure mechanism that has been unnoticed so far.

In the foregoing, the invention made by the inventors of the present invention has been concretely described based on the embodiments. However, it is needless to say that the present invention is not limited to the foregoing embodiments and various modifications and alterations can be made within the scope of the present invention.

INDUSTRIAL APPLICABILITY

The present invention can be used in a system that performs analysis, detection, maintenance, and others of various apparatuses.

The invention claimed is:

1. An apparatus abnormality diagnosis method of performing an apparatus abnormality diagnosis process for estimating a cause for the sign of abnormality or the abnormality by using information processing with a computer when a sign of abnormality of a target apparatus is detected or an abnormality occurs, and making an instruction for operation of the cause or maintenance operation details, wherein
in a process of creating or updating an diagnosis model of the apparatus for use in the apparatus abnormality diagnosis process,
at least one of apparatus event data and alarm data output from at least one of the apparatus and an external abnormality detection system is used, and the creating or updating process includes:
a first process step of obtaining, in a predetermined unit of time, maintenance operation data regarding the apparatus and at least one of the alarm data and the apparatus event data;
a second process step of, by using the data obtained in the first process step, creating a structured abnormality between a relevant maintenance operation and at least one of an apparatus event and alarm associated therewith as a structured abnormality model represented by a graph network structure; and a third process step of, by synthesizing the new structured abnormality model created in the second process step with a structured abnormality model created so far and recalculating a probability of occurrence among nodes updated in the graph network structure, updating the diagnosis model formed so as to include the resultant structured abnormality model;

wherein in the process of creating or updating the diagnosis model of the apparatus, three pieces of data output from the apparatus, comprising sensor data, the apparatus event data, and the alarm data, and alarm data output from the external detection system detecting a sign of abnormality or an abnormality are used, in the first process step, the maintenance operation data includes information of a date and time and type of the maintenance operation and components, the apparatus event data includes information of a type of an operation state of the apparatus and a date and time of occurrence, the alarm data includes information of an alarm type and a date and time of occurrence, and data of the apparatus event and the alarm occurring within a predetermined time period is obtained based on the date and time of the maintenance operation, and in the second process step, a structured abnormality between the type of the maintenance operation and an apparatus event type and alarm type associated therewith is created as a structured abnormality model represented by the graph network structure, wherein the first process step, the second process step and the third process step are effected by a hardware processor.

2. The apparatus abnormality diagnosis method according to claim 1, including a fourth process step of performing the apparatus abnormality diagnosis process by using at least one of the new apparatus event data and alarm data and the diagnosis model updated in the third process step.

3. The apparatus abnormality diagnosis method according to claim 2, wherein in the fourth process step, when the new alarm data is obtained, the maintenance operation data and the apparatus event data and alarm data are obtained in a previous predetermined unit of time to create structured abnormality data representing an occurrence pattern regarding a relevant alarm, a graph network part matching the structured abnormality data this time is extracted from the diagnosis model updated in the third process step and, based on the result, maintenance operation candidate information is output.

4. The apparatus abnormality diagnosis method according to claim 2, wherein the fourth process step includes a process step of displaying information of making an instruction for operation of the cause or maintenance operation details on a screen of an information processing apparatus to be used by an administrator or a maintenance operator of the system.

5. The apparatus abnormality diagnosis method according to claim 1, including a process step of displaying information of the diagnosis model or a structured abnormality model therein on a screen of an information processing apparatus to be used by an administrator or a maintenance operator of the system.

6. An apparatus abnormality diagnosis method of performing an apparatus abnormality diagnosis process for estimating a cause for the sign of abnormality or the abnormality by using information processing with a computer when a sign of abnormality apparatus is detected or an abnormality occurs, and making an instruction for operation of the cause or maintenance operation details, wherein in a process of creating or updating an diagnosis model of the apparatus for use in the apparatus abnormality diagnosis process, at least one of apparatus event data and alarm data output from a least one of the apparatus and an external abnormality detection system is used, and the creating or updating process includes:

a first process step of obtaining, in a predetermined unit of time, maintenance operation data regarding the apparatus and at least one of the alarm data and the apparatus event data;

a second process step of, by using the data obtained in the first process step, creating a structured abnormality between a relevant maintenance operation and at least one of an apparatus event and alarm associated therewith as a structured abnormality model represented by a graph network structure; and a third process step of, by synthesizing the new structured abnormality model created in the second process step with a structured abnormality model created so far and recalculating a probability of occurrence among nodes updated in the graph network structure, updating the diagnosis formed so as to include the resultant structured abnormality model;

wherein the structured abnormality model includes, for each node in the graph network, data of the probability of occurrence corresponding to all combinations of occurrence patterns with one or more nodes having an input relation to a relevant node and occurrence patterns with one or more nodes having an output relation from the relevant node, and wherein the first process step, the second process step and the third process step are effected by a hardware processor.

7. The apparatus abnormality diagnosis method according to claim 6, including a fourth process step of performing the apparatus abnormality diagnosis process by using at least one of the new apparatus event data and alarm data and the diagnosis model updated in the third process step.

8. The apparatus abnormality diagnosis method according to claim 7, wherein in the fourth process step, when the new alarm data is obtained, the maintenance operation data and the apparatus event data and alarm data are obtained in a previous predetermined unit of time to create structured abnormality data representing an occurrence pattern regarding a relevant alarm, a graph network part matching the structured abnormality data this time is extracted from the diagnosis model updated in the third process step and, based on the result, maintenance operation candidate information is output.

9. The apparatus abnormality diagnosis method according to claim 7, wherein the fourth process step includes a process step of displaying information of making an instruction for operation of the cause or maintenance operation details on a screen of an information processing apparatus to be used by an administrator or a maintenance operator of the system.

10. The apparatus abnormality diagnosis method according to claim 6, including a process step of displaying information of the diagnosis model or a structured abnormality model therein on a screen of an information processing apparatus to be used by an administrator or a maintenance operator of the system.

11. An apparatus abnormality diagnosis method of performing an apparatus abnormality diagnosis process for estimating a cause for the sign of abnormality or the abnormality by using information processing with a computer when a sign of abnormality of a target apparatus is detected or an abnormality occurs, and making an instruction for operation of the cause or maintenance operation details, wherein in a process of creating or updating an diagnosis model of the apparatus for use in the apparatus abnormality diagnosis process, at least one of apparatus event data and alarm data output from at least one of the apparatus and an external abnormality detection system is used, and the creating or updating process includes:

a first process step of obtaining, in a predetermined unit of time, maintenance operation data regarding the apparatus and at least one of the alarm data and the apparatus event data;

a second process step of, by using the data obtained in the first process step, creating a structured abnormality between a relevant maintenance operation and at least one of an apparatus event and alarm associated therewith as a structured abnormality model represented by a graph network structure; and a third process of, by synthesizing the new structured abnormality model created in the second process step with a structured abnormality model created so far and recalculating a probability of occurrence among nodes updated in the graph network structure, updating the diagnosis model formed so as to include the resultant structured abnormality model;

wherein in the process of creating or updating the diagnosis model of the apparatus, the first process step includes:

(A) a process step of obtaining a history of previous maintenance operation data regarding the relevant apparatus; and (B) a process step of obtaining a history of previous alarm data and apparatus event data regarding the relevant apparatus, and the second and third process steps include:

(C) a process step of calculating transition data of the number of times of occurrence in a predetermined unit of time for each maintenance operation type by using the history obtained in the process step (A);

(D) a process step of calculating transition data of the number of times of occurrence in a predetermined unit of time for each alarm type and each apparatus event type by using the history obtained in the process step (B);

(E) a process step of calculating a correlation coefficient between transition data of the number of times of occurrence for said each maintenance operation type and transition data of the number of times of occurrence for said each apparatus event type and alarm type;

(F) a process step of extracting, from the correlation coefficients calculated in the process step (E), a maintenance operation type and an apparatus event type and an alarm type having a correlation coefficient satisfying a threshold, and creating a graph network among the extracted data;

(G) a process step of creating one or more groups of a maintenance operation type and an apparatus event type and an alarm type having a closed-circuit relation with a structured computation for the graph network created in the process step (F); and (H) a process step of setting a directivity of the graph network based on an order of a date and time of occurrence of each data in the groups created in the process step (G), wherein the first process step, the second process step and the third process step are effected by a hardware processor.

12. The apparatus abnormality diagnosis method according to claim 11, including a fourth process step of performing the apparatus abnormality diagnosis process by using at least one of the new apparatus event data and alarm data and the diagnosis model updated in the third process step.

13. The apparatus abnormality diagnosis method according to claim 12, wherein in the fourth process step, when the new alarm data is obtained, the maintenance operation data and the apparatus event data and alarm data are obtained in a previous predetermined unit of time to create structured abnormality data representing an occurrence pattern regarding a relevant alarm, a graph network part matching the structured abnormality data this time is extracted from the diagnosis model updated in the third process step and, based on the result, maintenance operation candidate information is output.

14. The apparatus abnormality diagnosis method according to claim 12, wherein the fourth process step includes a process step of displaying information of making an instruction for operation of the cause or maintenance operation details on a screen of an information processing apparatus to be used by an administrator or a maintenance operator of the system.

15. The apparatus abnormality diagnosis method according to claim 11, including a process step of displaying information of the diagnosis model or a structured abnormality model therein on a screen of an information processing apparatus to be used by an administrator or a maintenance operator of the system.

* * * * *